(12) United States Patent
Sromin

(10) Patent No.: US 10,141,805 B2
(45) Date of Patent: Nov. 27, 2018

(54) PLANAR STATOR WITH EFFICIENT USE OF SPACE

(71) Applicant: ALBUS Technologies Ltd., Ashdod (IL)

(72) Inventor: Alexander Sromin, Ashdod (IL)

(73) Assignee: ALBUS Technologies Ltd., Ashdod (IL)

( * ) Notice: Subject to any disclaimer, the term of this patent is extended or adjusted under 35 U.S.C. 154(b) by 580 days.

(21) Appl. No.: 14/424,064

(22) PCT Filed: Aug. 27, 2013

(86) PCT No.: PCT/IL2013/050729
§ 371 (c)(1),
(2) Date: Feb. 26, 2015

(87) PCT Pub. No.: WO2014/033716
PCT Pub. Date: Mar. 6, 2014

(65) Prior Publication Data
US 2015/0229173 A1 Aug. 13, 2015

Related U.S. Application Data

(60) Provisional application No. 61/773,295, filed on Mar. 6, 2013, provisional application No. 61/693,375, filed on Aug. 27, 2012.

(51) Int. Cl.
*H02K 3/28* (2006.01)
*H02K 21/24* (2006.01)
(Continued)

(52) U.S. Cl.
CPC ............. *H02K 3/28* (2013.01); *H02K 1/2793* (2013.01); *H02K 1/32* (2013.01); *H02K 16/02* (2013.01); *H02K 21/24* (2013.01)

(58) Field of Classification Search
CPC ........ H02K 16/02; H02K 1/2793; H02K 1/32; H02K 21/24; H02K 3/28
(Continued)

(56) References Cited

U.S. PATENT DOCUMENTS

| 4,318,019 A | 3/1982 | Teasley et al. |
| 4,321,496 A | 3/1982 | Hickey |

(Continued)

FOREIGN PATENT DOCUMENTS

| CN | 101809847 | 8/2010 |
| FR | 2766027 | 1/1999 |

(Continued)

OTHER PUBLICATIONS

Office Action dated May 29, 2016 From the Israel Patent Office Re. Application No. 237468 and Its Translation Into English.
(Continued)

*Primary Examiner* — Alex W Mok

(57) ABSTRACT

Designs and method of construction for planar stators useable inter alia for axial air-gap electric machines are provided. In some embodiments these designs make highly efficient use of the space occupied by the stator, substantially filling most of its volume with active conductors. Some embodiments comprise at least one flexible conductor member (e.g. a flat cable) periodically bent by about 180° to form both external and internal peripheries of a two-layer planar stator. In some embodiments disk-like or ring-like members are used to shape and/or to secure the flexible conductor. In some embodiments adhesive members and/or encapsulating and/or potting of conductive elements provide solidity and rigidity of the stator(s). In some embodiments a plurality of planar stators are interleaved with a plurality of planar rotors, producing an efficient system electrical motor and/or generator.

21 Claims, 33 Drawing Sheets

(51) Int. Cl.
*H02K 1/27* (2006.01)
*H02K 1/32* (2006.01)
*H02K 16/02* (2006.01)

(58) Field of Classification Search
USPC ........................................................ 310/208
See application file for complete search history.

(56) References Cited

U.S. PATENT DOCUMENTS

| | | | |
|---|---|---|---|
| 4,336,475 A | | 6/1982 | Morinaga et al. |
| 4,476,409 A | | 10/1984 | Fukami |
| 4,644,209 A | | 2/1987 | Nozawa |
| 4,916,345 A | | 4/1990 | Tong |
| 5,117,553 A | | 6/1992 | Kliman |
| 5,710,476 A | | 1/1998 | Ampela |
| 5,744,896 A | | 4/1998 | Kessinger, Jr. et al. |
| 5,783,885 A | | 7/1998 | Post |
| 6,348,751 B1 | | 2/2002 | Jermakian et al. |
| 6,703,743 B2 | | 3/2004 | Kaneko et al. |
| 6,794,783 B2 | | 9/2004 | Tu et al. |
| 7,084,548 B1 | | 8/2006 | Gabrys |
| 7,170,212 B2 | | 1/2007 | Balson et al. |
| 7,375,449 B2 | | 5/2008 | Butterfield |
| 7,402,934 B1 * | | 7/2008 | Gabrys ................. H02K 3/345 310/179 |
| 7,586,217 B1 | | 9/2009 | Smith et al. |
| 7,816,822 B2 | | 10/2010 | Nashiki |
| 7,821,168 B2 | | 10/2010 | Halstead |
| 8,278,794 B2 | | 10/2012 | Ishikawa et al. |
| 8,397,369 B2 | | 3/2013 | Smith et al. |
| 8,400,038 B2 | | 3/2013 | Smith et al. |
| 8,819,921 B2 | | 9/2014 | Adachi |
| 2005/0236918 A1 | | 10/2005 | Van den Bergh et al. |
| 2005/0285467 A1 | | 12/2005 | Shimizu |
| 2006/0066167 A1 | | 3/2006 | Saito et al. |
| 2006/0075627 A1 | | 4/2006 | Asao |
| 2006/0113857 A1 | | 6/2006 | Honkura et al. |
| 2006/0238058 A1 * | | 10/2006 | Koide ................... H02K 1/278 310/156.55 |
| 2007/0040465 A1 * | | 2/2007 | Al-Khayat .......... H02K 1/2793 310/179 |
| 2007/0200445 A1 | | 8/2007 | Yamagiwa |
| 2007/0290582 A1 | | 12/2007 | Han et al. |
| 2008/0067883 A1 | | 3/2008 | Witt et al. |
| 2008/0093948 A1 * | | 4/2008 | Naganawa ........... H02K 15/063 310/203 |
| 2008/0238266 A1 | | 10/2008 | Moriyama et al. |
| 2008/0278022 A1 | | 11/2008 | Burch et al. |
| 2009/0251021 A1 | | 10/2009 | Atarashi et al. |
| 2009/0273252 A1 | | 11/2009 | Nakamasu et al. |
| 2010/0090555 A1 | | 4/2010 | Tajima et al. |
| 2010/0117481 A1 | | 5/2010 | Greaves et al. |
| 2010/0253173 A1 | | 10/2010 | Miyata et al. |
| 2010/0295316 A1 | | 11/2010 | Grassman |
| 2011/0024567 A1 | | 2/2011 | Blackwelder et al. |
| 2011/0266811 A1 | | 11/2011 | Smadja |
| 2012/0091832 A1 | | 4/2012 | Soderberg |
| 2012/0262019 A1 | | 10/2012 | Smith et al. |
| 2012/0313473 A1 | | 12/2012 | Chen et al. |
| 2013/0214631 A1 | | 8/2013 | Smith et al. |
| 2014/0054998 A1 | | 2/2014 | Kim et al. |
| 2014/0132102 A1 | | 5/2014 | Peng et al. |
| 2015/0229194 A1 | | 8/2015 | Sromin |

FOREIGN PATENT DOCUMENTS

| | | |
|---|---|---|
| WO | WO 2008/119120 | 10/2008 |
| WO | WO 2011/032201 | 3/2011 |
| WO | WO 2011/139396 | 11/2011 |
| WO | WO 2014/033715 | 3/2014 |
| WO | WO 2014/033716 | 3/2014 |

OTHER PUBLICATIONS

Notification of Office Action and Search Report dated Aug. 25, 2016 From the State Intellectual Property Office of the People's Republic of China Re. Application No. 201380045853.0 and Its Translation of Office Action Into English.
Notification of Office Action and Search Report dated Aug. 30, 2016 From the State Intellectual Property Office of the People's Republic of China Re. Application No. 201380053597.X.
Office Action dated Sep. 1, 2016 From the Israel Patent Office Re. Application No. 237469 and Its Translation Into English.
Translation of Notification of Office Action dated Aug. 30, 2016 From the State Intellectual Property Office of the People's Republic of China Re. Application No. 201380053597.X.
International Preliminary Report on Patentability dated Mar. 12, 2015 From the International Bureau of WIPO Re. Application No. PCT/IL2013/050728.
International Preliminary Report on Patentability dated Mar. 12, 2015 From the International Bureau of WIPO Re. Application No. PCT/IL2013/050729.
International Search Report and the Written Opinion dated Jan. 7, 2014 From the International Searching Authority Re. Application No. PCT/IL2013/050728.
International Search Report and the Written Opinion dated Jan. 7, 2014 From the International Searching Authority Re. Application No. PCT/IL2013/050729.
Supplementary European Search Report and the European Search Opinion dated Apr. 8, 2016 From the European Patent Office Re. Application No. 13832974.3.
Supplementary European Search Report and the European Search Opinion dated Apr. 13, 2016 From the European Patent Office Re. Application No. 13833214.3.
Notification of Office Action dated Jul. 6, 2017 From the State Intellectual Property Office of the People's Republic of China Re. Application No. 201380045853.0. (5 Pages).
Notification of Office Action dated Jun. 29, 2017 From the State Intellectual Property Office of the People's Republic of China Re. Application No. 201380053597.X. (6 Pages).
Translation of Notification of Office Action dated Jul. 6, 2017 From the State Intellectual Property Office of the People's Republic of China Re. Application No. 201380045853.0. (4 Pages).
Translation of Notification of Office Action dated Jun. 29, 2017 From the State Intellectual Property Office of the People's Republic of China Re. Application No. 201380053597.X. (6 Pages).
Notification of Office Action dated Jan. 3, 2018 From the State Intellectual Property Office of the People's Republic of China Re. Application No. 201380053597.X. (6 Pages).
Restriction Official Action dated Dec. 5, 2017 From the US Patent and Trademark Office Re. U.S. Appl. No. 14/424,071. (7 pages).
Translation of Notification of Office Action dated Jan. 3, 2018 From the State Intellectual Property Office of the People's Republic of China Re. Application No. 201380053597.X. (8 Pages).
Notification of Office Action dated Mar. 12, 2018 From the State Intellectual Property Office of the People's Republic of China Re. Application No. 201380045853.0 and Its Translation Into English. (10 Pages).
Official Action dated Jul. 12, 2018 From the US Patent and Trademark Office Re. U.S. Appl. No. 14/424,071. (40 pages).

* cited by examiner

PLANAR STATOR WITH EFFICIENT USE OF SPACE

RELATED APPLICATIONS

This application is a National Phase of PCT Patent Application No. PCT/IL2013/050729 having International filing date of Aug. 27, 2013, which claims the benefit of priority under 35 USC 119(e) of U.S. Provisional Patent Applications Nos. 61/693,375 filed on Aug. 27, 2012 and 61/773,295 filed on Mar. 6, 2013. The contents of the above applications are all incorporated by reference as if fully set forth herein in their entirety.

FIELD AND BACKGROUND OF THE INVENTION

The present invention, in some embodiments thereof, relates to a planar stator and, more particularly, but not exclusively, to a stator for an axial air-gap electric machine such as a motor and/or a generator.

Prior art brushless axial gap electric machines which incorporate planar stators typically comprise windings comprising either separated coils or entire-phase coil chains. In both cases, the active winding conductor sections occupy only a part of a disk-shaped volume defined by the planar structure of the stator, since the winding design does do not allow for overlapping of wound components.

U.S. Pat. No. 4,336,475 to Shigeki Morinaga et al. discloses a poly-phase multi-layer planar winding made of separated triangular coils. The stator volume utilization efficiency may be about 50% since about half of volume both inside and outside of the coils is not used.

US patent application 2010/0253173A1 by Koji Miyata et al discloses a single-phase single-layer planar winding made of separated triangular coils embedded into solid construction. The stator volume utilization efficiency may be about 50% since about half of volume both inside and outside of coils is not used.

US patent application 2010/0295316A1 by Derek Grassman discloses a single-phase single-layer planar winding made of separated triangular coils embedded into solid construction. The stator volume utilization efficiency may be about 67% since about one-third of volume inside of coils is not used.

US patent application 2008/000678833A1 by Peter D. Witt discloses a three-phase two-layer planar winding made of three half-circle coil chains stacked and glued to each other. Stator volume utilization efficiency in this case may also be about 50%, since about half of volume inside of coils is not used.

U.S. Pat. No. 7,084,548B1 to Chrystopher W. Gabrys discloses a 3-phase single-layer NON-planar winding made of separated coils. The stator volume utilization efficiency may be about 100%, but the stator disclosed by Gabrys is not planar and therefore has inherent functional disadvantages, including the fact that such stators cannot efficiently be stacked face-to-face with other stators in multi-stator designs, cannot easily be used in modular multi-stator/rotor electric machines, and impose limitations on compatible rotor designs.

U.S. Pat. No. 4,476,409 to Tadashi Fukami discloses 3-phase cup-like windings. The stator volume utilization efficiency may be about 100%, but such stators also are non planar and may efficiently be used only in single-stator single-module electric machines.

US patent application 2010/0117481A1 by Matthew Greaves et al discloses a 3-phase double-layer non-planar winding made of twisted phase conductors. The stator volume utilization efficiency may be about 100%, but this stator also is not planar, and therefore also has the inherent functional disadvantages of the non-planar stator designs mentioned above.

SUMMARY OF THE INVENTION

Some embodiments of the present invention provide planar stators (optionally coreless) in which the stator windings occupy most of the volume housing the stators, because little space is lost inside stator windings and between radial sections of windings. This results in improvements in electrical power density, since prior art designs typically require more voluminous mechanisms to produce mechanical and/or electrical effects comparable to those producible by some embodiments of the present invention disclosed below.

Apparatus and methods disclosed herein include axial air-gap electric machines which comprise a planar stator comprising a wound conductor in which conducting sections of the winding occupy more than 75% of a disk-shaped volume containing the stator. In some embodiments, stator designs described below may in some circumstances provide stators which are less bulky and/or more efficient than those currently known in the art.

According to some embodiments of the invention, a stator of an axial flux electric machine comprises windings which intersect more than 75%, or at least 85%, or at least 95% of lines of flux originating at a rotor of that machine and traverse the smallest cylindrical volume which contains that stator.

According to an aspect of some embodiments of the present invention there is provided a wound apparatus which comprises a wound conductor in which material of the wound conductor occupies more than 75% of a cylindrical volume which contains the apparatus.

According to some embodiments of the invention, the apparatus may be connected as an antenna.

According to some embodiments of the invention, the apparatus is comprised in an axial air-gap electric machine.

According to some embodiments of the invention, the apparatus comprises a conductor member periodically bent by about 180° to form external and internal peripheries and first and second planar surfaces between the peripheries.

According to an aspect of some embodiments of the present invention there is provided an axial air-gap electric machine which comprises a planar disk-shaped stator comprising a conductor member periodically bent by about 180° to form external and internal peripheries and first and second planar surfaces between the peripheries.

According to some embodiments of the invention, the conductor member is comprised in a flat cable which comprises a plurality of conductor members within an insulating envelope.

According to some embodiments of the invention, the machine comprises a plurality of the conductor members.

According to some embodiments of the invention, the conductor member is shaped as a flat conductor wider than it is deep.

According to some embodiments of the invention, the conductor member comprises stranded wire.

According to some embodiments of the invention, the conductor member comprises Litz-wire wire.

According to some embodiments of the invention, portions of the conductor member positioned between the external and internal peripheries have an approximately radial direction.

According to some embodiments of the invention, portions of the conductor member positioned between the external and internal peripheries are of constant width.

According to some embodiments of the invention, portions of the conductor member positioned between the external and internal peripheries are of variable width.

According to some embodiments of the invention, portions of the conductor member near the external periphery are wider than portions of the conductor member near the internal periphery.

According to some embodiments of the invention, width of a portion of the conductor member is approximately proportional to a distance of the portion from a geometric center of the stator.

According to some embodiments of the invention, the conductor member comprises a plurality of independent conductors of differing phases.

According to some embodiments of the invention, the machine comprises a plurality of the planar stators.

According to some embodiments of the invention, the plurality of stators are mounted in parallel.

According to some embodiments of the invention, the plurality of stators are axially distanced by less than the width of each stator.

According to some embodiments of the invention, the bends at the internal and at the external peripheries are in a same direction.

According to some embodiments of the invention, the bends at the internal and at the external peripheries are in opposite directions.

According to some embodiments of the invention, the bent conductor member comprises a plurality of electrically separated and adjacently positioned conductors, forming a poly-phase stator.

According to some embodiments of the invention, the stator comprises a plurality of conductor members angularly shifted with respect to one another, and interleaved.

According to some embodiments of the invention, the bent conductor member is secured on a substrate tape bent at inner and outer peripheries.

According to some embodiments of the invention, the tape has an adhesive surface.

According to some embodiments of the invention, the tape comprises a ferromagnetic material.

According to some embodiments of the invention, the conductor member has a flat form and an adhesive backing on one of its flat sides.

According to some embodiments of the invention, the bent conductor member is comprises a chain which comprises a plurality of solid flat links and flexible conductor connections between the links, the links being joined at internal and external peripheries of the stator by the flexible connections.

According to some embodiments of the invention, the conductor members are a plurality of electrically independent conductors adjacently wrapped around a central disk.

According to some embodiments of the invention, the central disk comprises ferromagnetic material.

According to some embodiments of the invention, three separate but grouped conductor members are connected as a cable which comprises three conductor elements encased in a common isolating element.

According to some embodiments of the invention, the conductor members are embodied as one of stranded wire and Litz wire.

According to some embodiments of the invention, the central disk comprises a plurality of trapezoidal radial ribs not reaching inner and outer peripheries of the disk.

According to some embodiments of the invention, the disk comprises plurality of ribs extending to its inner and outer peripheries.

According to some embodiments of the invention, each of the ribs comprises a straight portion and a curved portion.

According to some embodiments of the invention, the conductor member is repeatedly wrapped around a) an internal ring defining an internal periphery of the stator, and b) an external ring defining an external periphery of the stator.

According to some embodiments of the invention, the conductor members are encapsulated into a solid disk structure.

According to some embodiments of the invention, the stator is positioned between two permanent magnet rotors.

According to some embodiments of the invention, the machine comprises a plurality of the planar stators.

According to some embodiments of the invention, the machine further comprises a plurality of planar rotors.

According to an aspect of some embodiments of the present invention there is provided a method of constructing a stator, comprising wrapping a flat conductor by periodically bending the conductor by approximately 180° at first positions which together define an approximately circular external periphery of a winding, and at second positions which together define an approximately circular internal periphery of a winding.

According to some embodiments of the invention, the method further comprises wrapping the cable around edges of a disk, the external periphery thereby being formed around an external edge of the disk and the internal periphery thereby being formed around an internal edge of the disk.

According to some embodiments of the invention, the method further comprises wrapping the cable around inner and outer rings, thereby forming the internal and external peripheries.

According to some embodiments of the invention, the cable comprises or attaches to a sticky surface.

According to some embodiments of the invention, the method further comprises mounting the coil as a stator of an axial air gap electric machine.

According to some embodiments of the invention, the method further comprises mounting a plurality of the coils connected as stators of an axial air gap electric machine and mounted parallel to each other and interspersed with a plurality of rotors.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
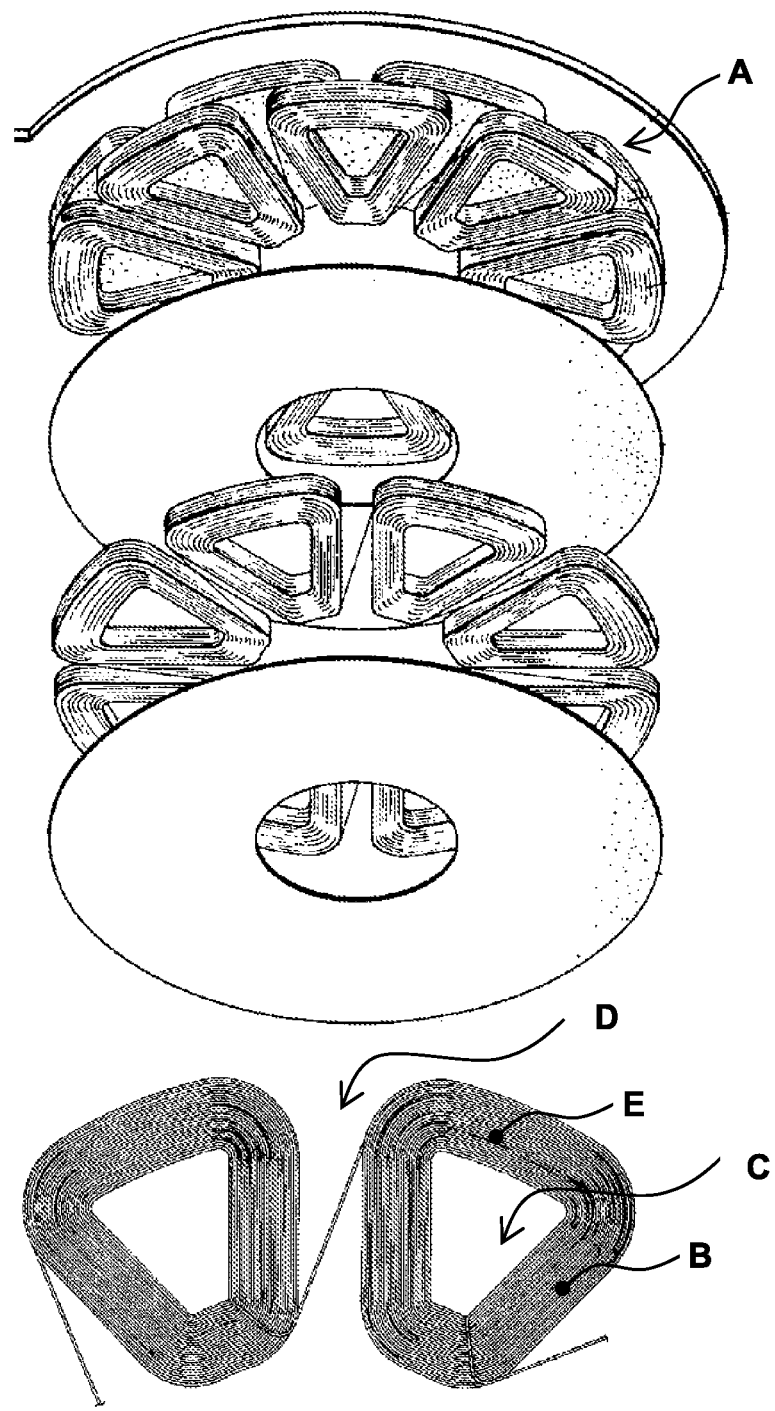
FIG. 1 includes an isometric view of a planar coreless stator and a top view of separated coils incorporated into that stator, according to methods of prior art.

The present invention, in some embodiments thereof, relates to a planar coreless stator and, more particularly, but not exclusively, to a stator for an axial air-gap electric machine such as a motor and/or a generator, and to electrical machines comprising such a stator.

As used throughout the present disclosure and in the claims below, the terms "machine" and "electrical machine" are to be understood to include both electric motors and electric generators.

The spatial and electrical efficiency of prior art designs for brushless electrical machines, and in particular for brushless electrical machines comprising planar stators, may be considered somewhat low. Prior art designs for machines with planar stators have significant amounts of empty (e.g. air-filled) space inside coils and/or between the radial sections of stator windings. Some embodiments of the present invention fill with conductive windings most (e.g. some embodiments more than 70%, some more than 75%, some more than 85%, and some more than 95%) of the volume of the smallest truncated cylinder (i.e. disk-shaped volume) that could contain the stator, and may provide improved electrical efficiency and/or improved spatial efficiency as compared to some designs of prior art.

Similarly, it may be noted that designs of some embodiments of the present invention comprise windings which will intersect at least 70%, or at least 75%, or at least 85%, or at least 95% of lines of flux extending from a rotor used with these windings in an axial flux electric machine.

In some embodiments of the invention, a planar stator and/or other object has at least one and optionally two surfaces which are nearly geometrically planar, over at least 80% or 90% or more of their surface area. Optionally, the surface is nearly planar when it is within 5% or 10% of a flat plane passing through the surface, the percentage being the arithmetic average thickness of the stator. In an exemplary embodiment of the invention, the two surfaces are substantially parallel (e.g., with an angle of between 175 and 195 degrees between two planes that each approximate a surface (e.g., using an RMS approximation of mass of parts of the surface)).

In an exemplary embodiment of the invention, the planar stator has a thickness with is less than 30%, 20%, 10% or intermediate percentages of a maximal dimension of the stator.

In some embodiments, a disk shape is used which approximates (e.g., within 10%, 5% or better per dimension) a straight prism with dimensions of its base surfaces which are less (e.g., 20%, 10% or intermediate or smaller percentages) of its height.

In some embodiments, a disk-shaped object is a planar object, for example, with a diameter which is less than 20%, 10% or intermediate percentages of its maximal extent in other dimensions.

For purposes of better understanding some embodiments of the present invention, as illustrated in FIGS. 6-26B of the drawings, reference is first made to FIGS. 1-5, which are provided to illustrate certain points in the following discussion of the state of the art. No detailed analysis of the cited systems is intended.

FIG. 1 is an isometric view of a planar coreless stator and a top view of separated coils incorporated into that stator, which was disclosed in U.S. Pat. No. 4,336,475 to Shigeki Morinaga.

Figure 2:
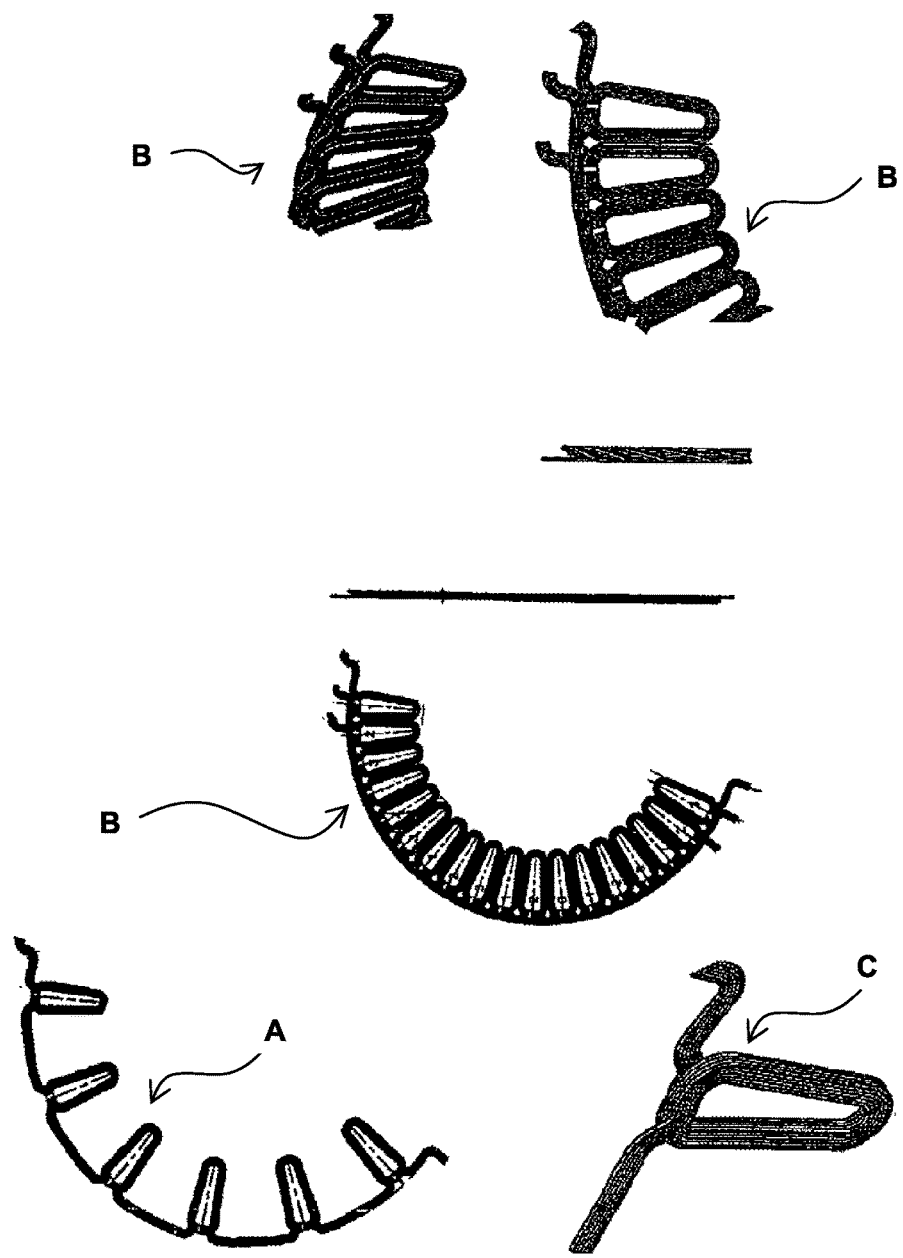
FIG. 2 shows isometric, top, and profile views of a planar coreless stator and coil chains comprised therein, according to methods of prior art.

FIG. 2 shows isometric, top, and profile views of a planar coreless stator and coil chains comprised therein, disclosed in United States Patent Application 2008/0067883 A1 by Peter D. Witt et al.

Figure 3:
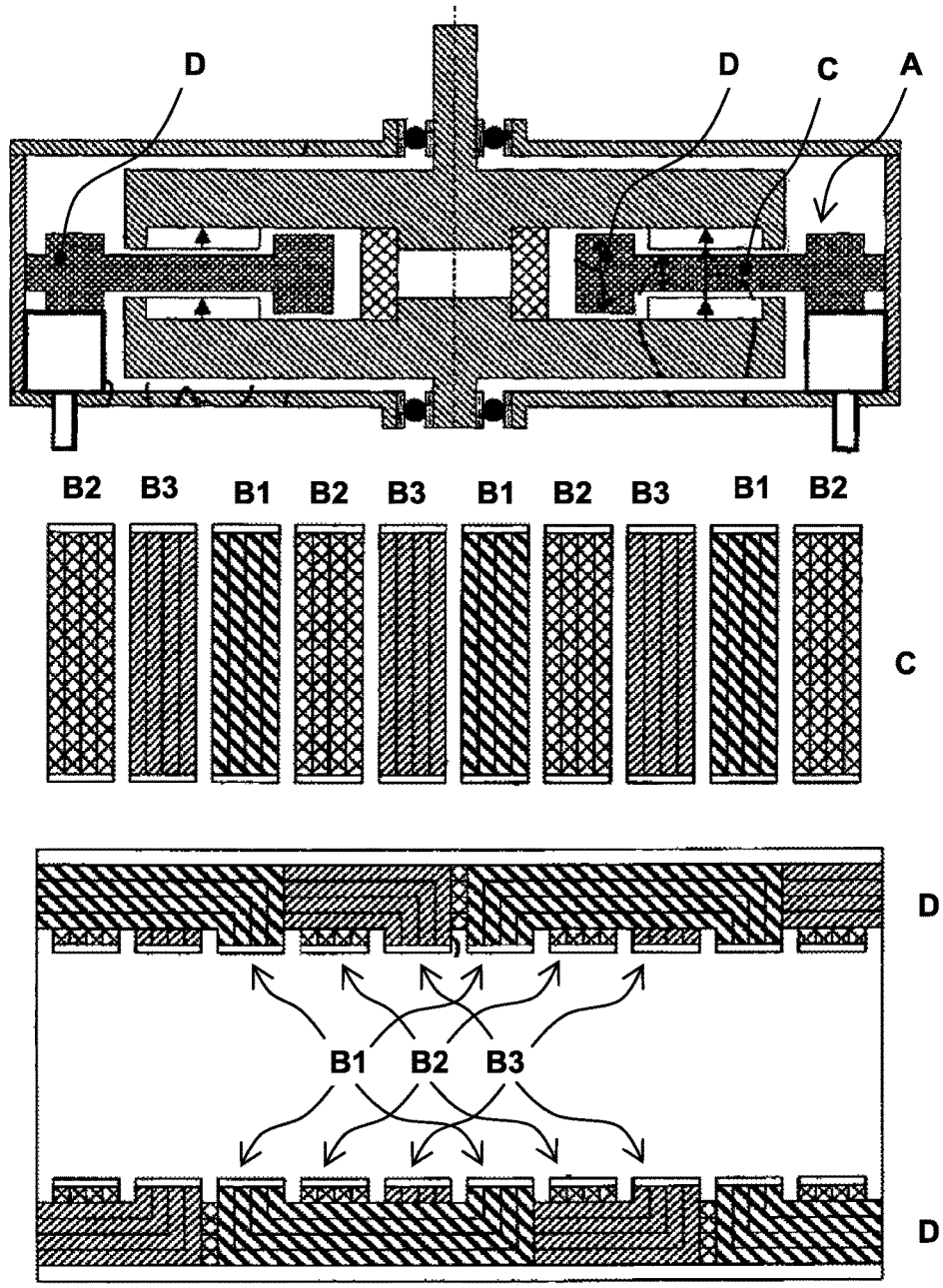
FIG. 3 includes a cross-section of an axial flux electric machine utilizing a non-planar coreless stator and a diagram of its 3-phase winding, according to methods of prior art.

FIG. 3 is a cross-section of an axial flux electric machine utilizing a non-planar coreless stator, and a diagram of its 3-phase winding, disclosed in U.S. Pat. No. 7,084,548 B1 to Chrystopher W. Gabrys.

Figure 4:
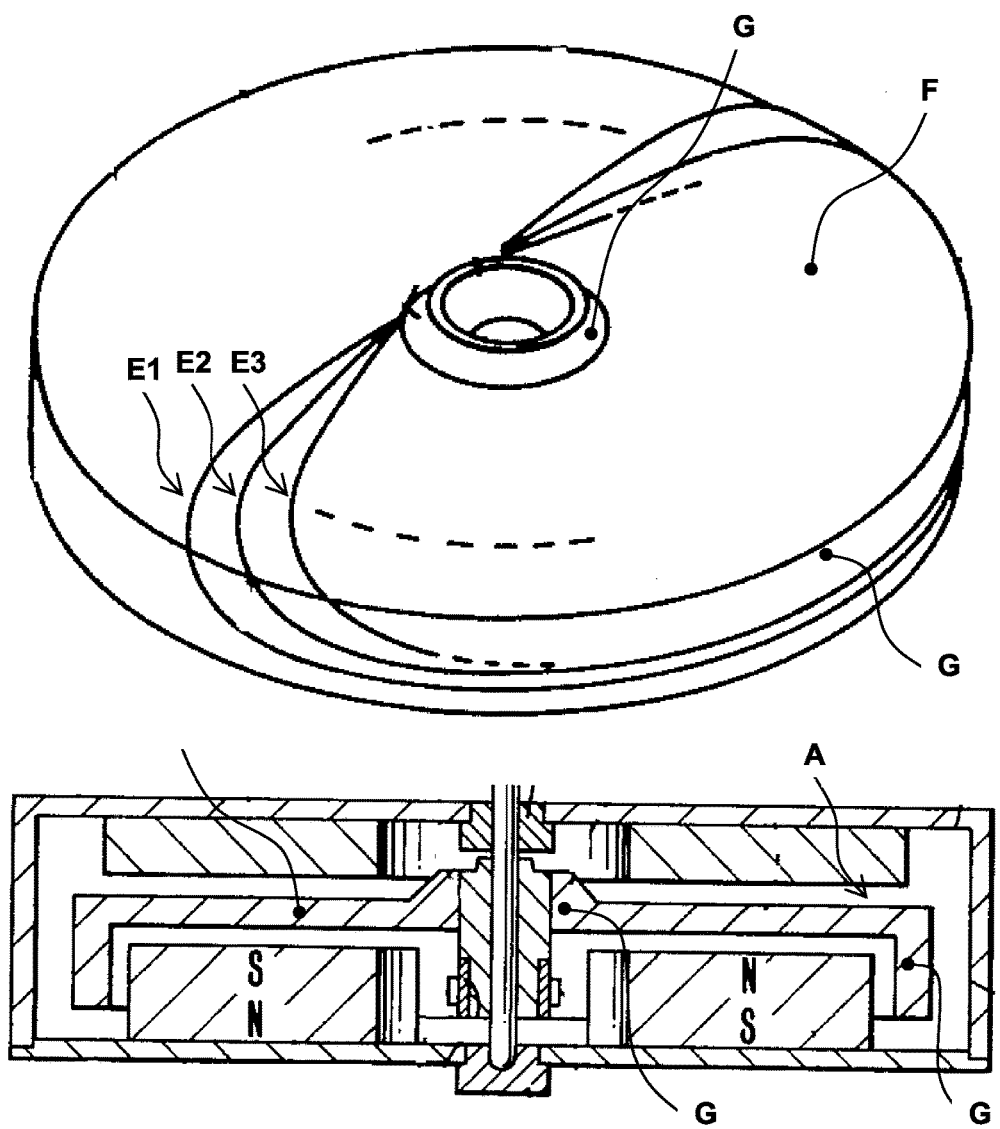
FIG. 4 includes an isometric view of a non-planar coreless stator and a cross-section of an electric axial flux machine utilizing it, according to methods of prior art.

FIG. 4 is an isometric view of a non-planar coreless stator and a cross-section of an electric axial flux machine utilizing it, disclosed in U.S. Pat. No. 4,476,409 to Tadashi Fukami.

Figure 5:
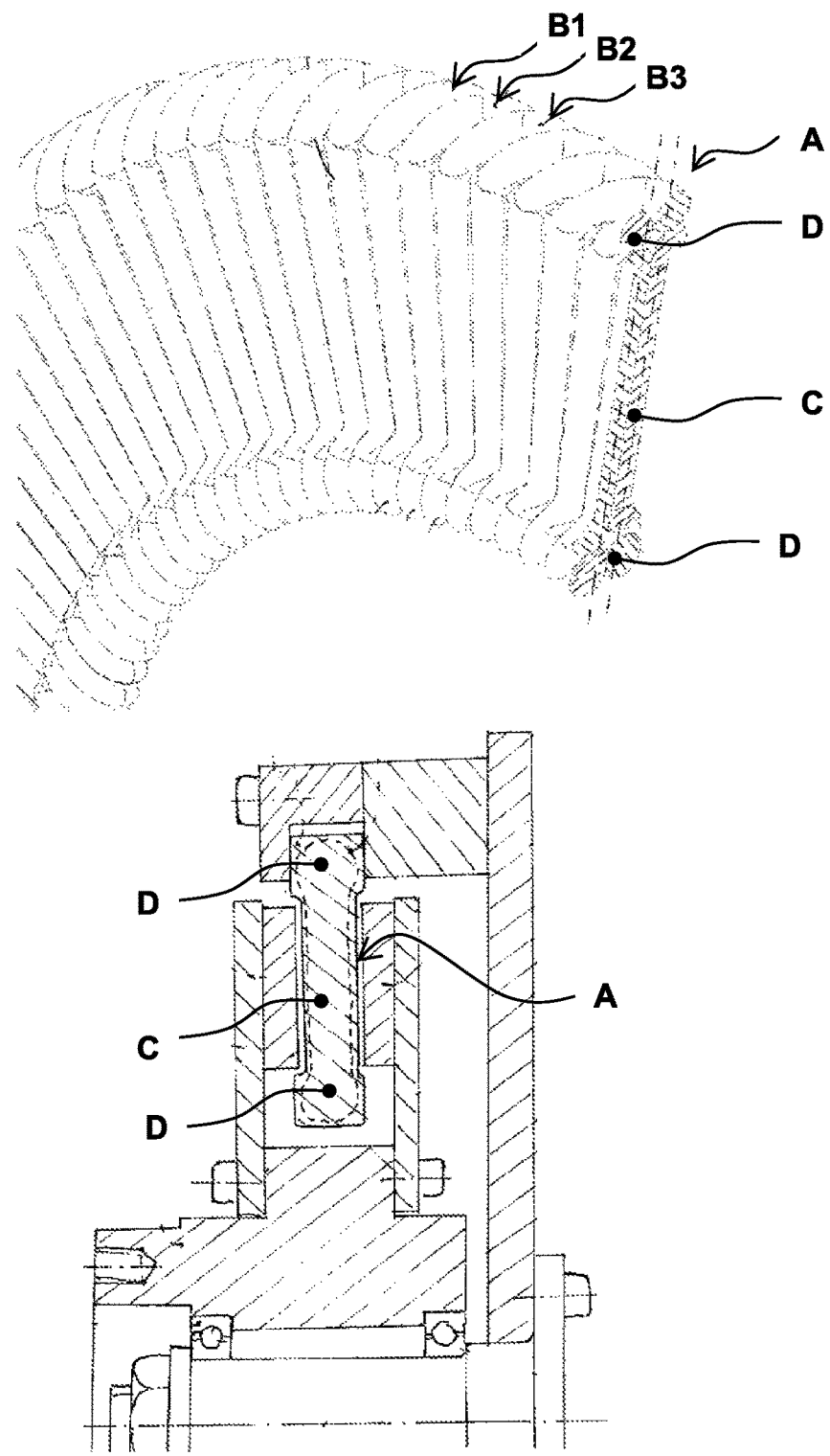
FIG. 5 includes a partial isometric view of a non-planar coreless stator and a cross-section of an electric axial flux machine utilizing that stator, according to methods of prior art.

FIG. 5 is a partial isometric view of a non-planar coreless stator and a cross-section of an electric axial flux machine utilizing that stator, disclosed in United States Patent Application 2010/0117481 A1 by Matthew Greaves et al.

In some prior arts designs of axial gap electric machines, the stator winding is planar and made of separated planar wound coils. Examples are U.S. Pat. No. 4,336,475 to Shigeki Morinaga (FIG. 1 of the figures), U.S. Patent Application 2010/0295316A1 by Derek Grassman, and U.S. Patent Application 2010/0253173A1 by Koji Miyata et al. As may be seen in FIG. 1, in these cases the stator is flat, but the active sections B of coils A occupy only a part of the volume occupied by the stator, since an overlapping of passive coil parts E is impossible. Thus, the stator volumes C and D are not used and, as a result, space utilization (as measured by the ratio of spaced filled with windings to space available within a cylinder containing the stator) is rather low (usually about 50-65%).

FIG. 2 shows a planar stator winding comprising phase chains A uniting coil loops C wound from the same conductor and forming together a three-phase two-layer planar construction B. In this case also, the stator volume utilization efficiency is about 50%.

FIGS. 3-5 provide examples of electric machines with a NON-planar stator winding. These designs have in common that they may have a very high utilization of stator volume, some near 100%, but do not have a planar format. Stators lacking planar format cannot be stacked against each other face-to-face, so they cannot easily be used in modular stackable electric machine designs, and consequently are inefficient in use of space if/when such modules are combined.

EXAMPLES

In FIG. 3, phase coils have portions which are overlapped. Portions D, where the overlap occurs, are thicker than plane part C, resulting in wasted space, as may be seen in the figure.

In FIG. 4, phase coils E1, E2, E3 are wound together forming a 3-phase cup-like stator A in which active winding sections build a plane part F while the passive winding sections build thick edge parts G.

In FIG. 5, the stator A is made of mutually interposed twisted phase conductors. B1, B2, B3. Their active sections form a plane part C of stator A while their passive sections form "ledge-like" thick parts D.

In each case, active portions are planar, at least approximately, but if one were to stack modules the active portions of one module would be held apart from the active portions of the next module by the thickened portions formed by the passive interconnections providing current to the active portions.

Some embodiments of the present invention provide a planar stator system comprising one or more planar stators, useable, for example, in axial flux brushless motors and/or generators, whose flat profile uses stator space more efficiently than designs of prior art. In some embodiments the stator comprises a plurality of flat conductors structures, (e.g. flat cables) periodically bent by about 180° to form external and internal (roughly circular) stator peripheries, thereby creating a zigzagging wire wrapping which forms a disk-like two-layer planar construction.

In some embodiments the inside surfaces of the flat conductor structures are glued to each other to form an integrated unit. In some embodiments the flat conductor structures are impregnated with a material and/or potted, to build a rigid stator construction. In some embodiments the flat conductor structures are wrapped around a thin planar disk-shape core, optionally made from insulating materials. The wrappings are optionally glued to the core, to make a solid and rigid stator construction. In some embodiments, motors comprising a plurality of planar stators interleaved with a plurality of rotors are provided.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now FIGS. 6-26B, attention is first drawn to FIG. 6, which is an isometric view of a stator winding structure comprising a flat conductor (also referred to as a "conducting member" herein and in the claims below) which is optionally a constant-width flexible cable which comprises a plurality of conductors, according to some embodiments of the present invention. In an exemplary implementation shown in the figure, a flat cable is bent 20 times at its internal circular periphery and bent 20 times in the same direction at its external circular periphery, thereby forming what is sometimes called a "wound apparatus" herein and in the attached claims.

Figure 6:
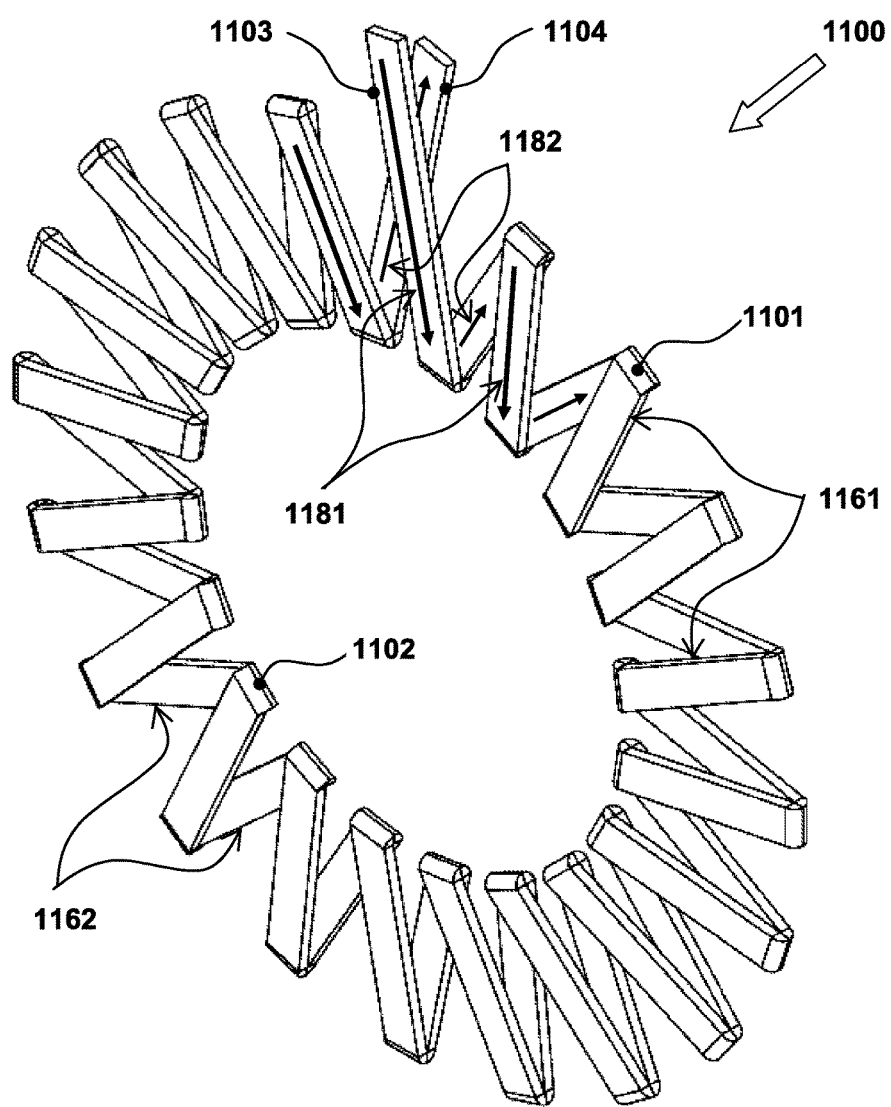
FIG. 6 is an isometric view of a stator winding structure comprising a flat constant-width flexible cable bent 20 times at its internal circular periphery and bent 20 times in the same direction at its external circular periphery, according to some embodiments of the present invention.

FIG. 6 shows a stator which can be incorporated in a planar (and optionally stackable) electric machine, for example of "axial flux" type. A stator as shown in FIG. 6 may be used, for example, as a component in a planar stator comprising a one or more flat conductor structure, (e.g. flat cables) periodically bent about 180° to form external and internal (approximately circular) stator peripheries. The exemplary embodiment shown in FIG. 6 comprises a two-layer 40 pole stator winding 1100 circularly wrapped from a constant width cable-like structure. In the exemplary embodiment shown, the cable is wrapped 20 times around an external periphery (positions 1101) and 20 times around an internal periphery (positions 1102), wrapping being always in a same direction (i.e. always clockwise, or always counter-clockwise). The resulting winding comprises upper layer sections 1161, lower layer sections 1162 and terminal ends 1103. Straight current paths 1181 on sections 1161 directed about outward from the center of the structure together with current paths 1182 on sections 1161 directed about inward to the center of the structure form a 40-pole (20-pole pair) winding. In an exemplary embodiment, where "d" is the external stator diameter, eps is the inner-to-outer stator diameter ratio (typically between 0.45 and 0.65), and p is the number of pole pairs (e.g. 20, in the exemplary embodiment shown in the figure), then in some embodiments the width of the cable will be approximately eps*πd/(2p).

In some embodiments, winding 1100 comprises a cable-like structure which comprises ferromagnetic material electrically isolated from conducting elements of that cable. For example, in some embodiments a cable might comprise a ferromagnetic material on one face of the cable, which ferromagnetic material might be positioned between conduction elements of sections 1161 and conducting elements of sections 1162 once the cable is wound as shown in the figure. (Note however that some embodiments are coreless, and ferromagnetic material is not used.)

It is noted that although FIG. 6 and in general FIGS. 6-26B show exemplary winding designs optimized for use as a stator of a machine, winding methods and configurations shown herein may also be used in other contexts. For example, windings such as those shown in FIGS. 6-26B can be connected for use as an antenna.

Figure 7:
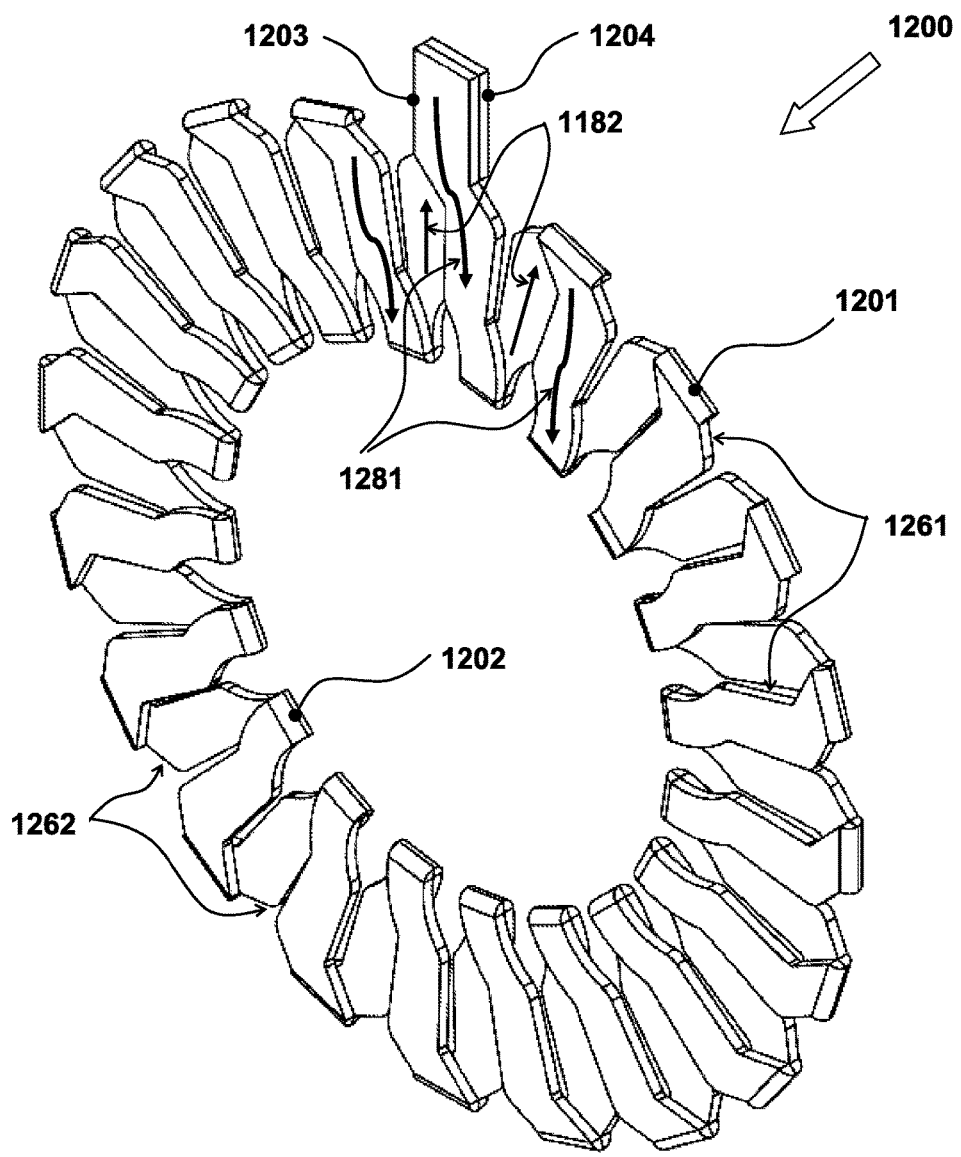
FIG. 7 is an isometric view of a stator winding structure comprising a flat, variable-width flexible cable bent 20 times at its internal circular periphery and bent 20 times in the same direction at its external circular periphery, according to some embodiments of the present invention.

Attention is now drawn to FIG. 7, which is an isometric view of a stator winding structure according to some embodiments of the invention. The structure shown in FIG. 7 is similar to that shown in FIG. 6, but uses a flat, variable-width flexible cable 1200 for the winding structure. In an exemplary embodiment shown in the figure, cable 1200 is wrapped 20 times around the external periphery (lines 1201) and 20 times around internal periphery (lines 1202) in a same direction (i.e. always clockwise, or always counter-clockwise). The winding comprises upper layer sections 1261 and lower layer sections 1262 and has terminal ends 1203. The curved current paths 1181 directed at least approximately outward from the geometrical center of the stator together with current paths 1182 on sections 1261 directed at least approximately inward to the center of the structure form a 40-pole (20-pole pair) winding. The variable-width shape shown in the figure permits most of the active portions of the winding to have a radial orientation.

In an exemplary embodiment according to FIG. 7, each cable section (i.e. each section between bends of the cable at inner and outer peripheries) consists of 3 portions: (a) a rather long inner portion which is relatively inactive and has an involuted shape whose length depends upon number of pole pairs (the greater p, the shorter the length of the inner portion); (b) a central and longest and most active portion having an approximately trapezoidal shape limited by 2 radiuses; and (c) a rather short outer portion which is relatively inactive and has a shape similar to a parallelogram whose length depends upon the pole pairs number p (the greater p, the shorter the length of the outer portion).

The width at any point on the variable-width active central portions will be approximately $\pi r/(p)$, where r is the radial distance of a given position on the winding, and p is the number of pole pairs (e.g. 20, in an exemplary embodiment shown in the figure).

In some embodiments, portions of a conductor member (e.g. cable 1200, as shown in the figure) positioned between external and internal peripheries of the winding structure, are of variable width. In some embodiments, portions of the conductor member near an external periphery of the structure are wider than portions near the internal periphery. Optionally, width of a portion of the conductor member is approximately proportional to a distance of that portion from a geometric center of the stator.

Figure 8A:
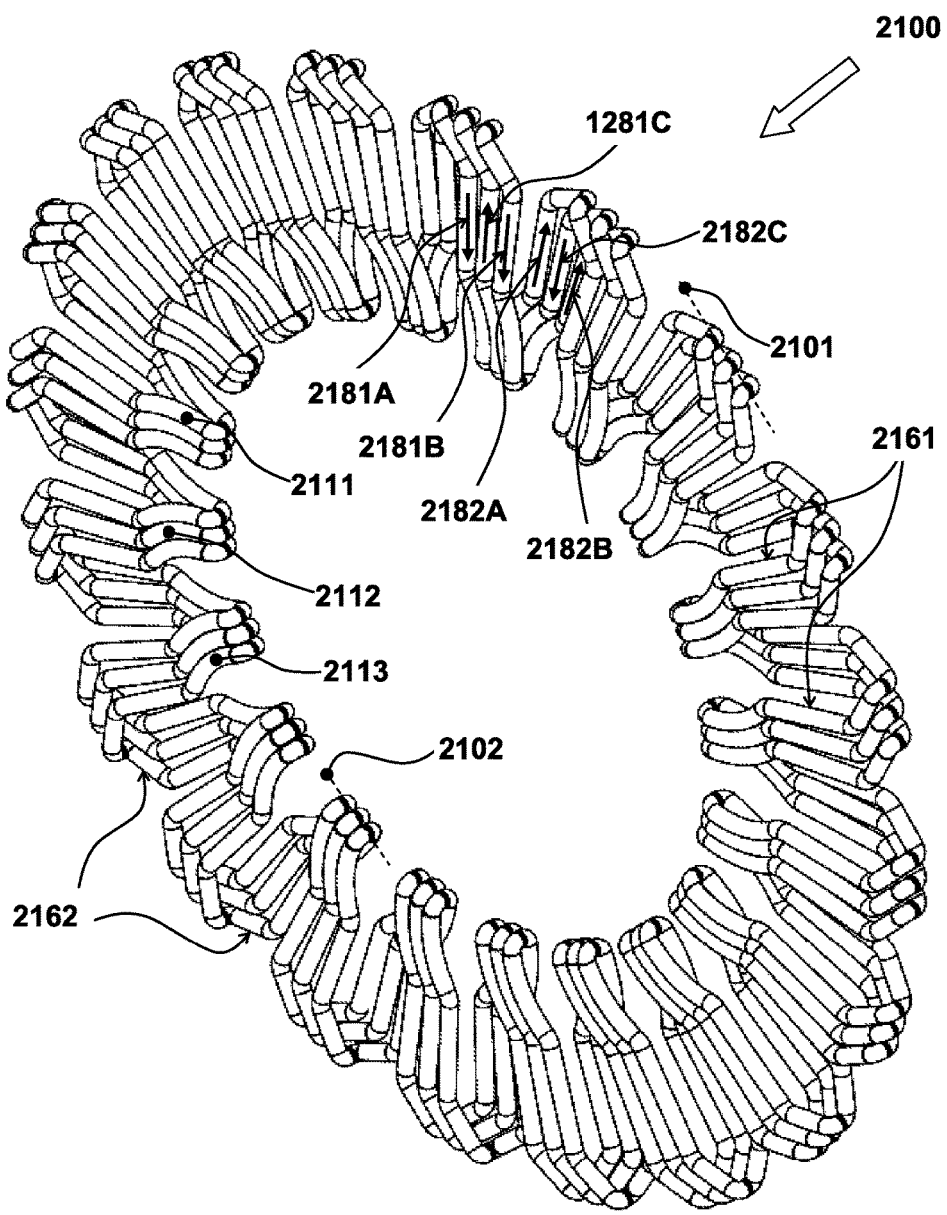
FIG. 8A is a an isometric view of a 40-pole 3-phase stator winding structure (input and output are not shown) comprising 3 separated but grouped conductors bent 20 times at their internal circular periphery and bent 20 times in the same direction at their external circular periphery; according to some embodiments of the present invention.
Figure 8B:
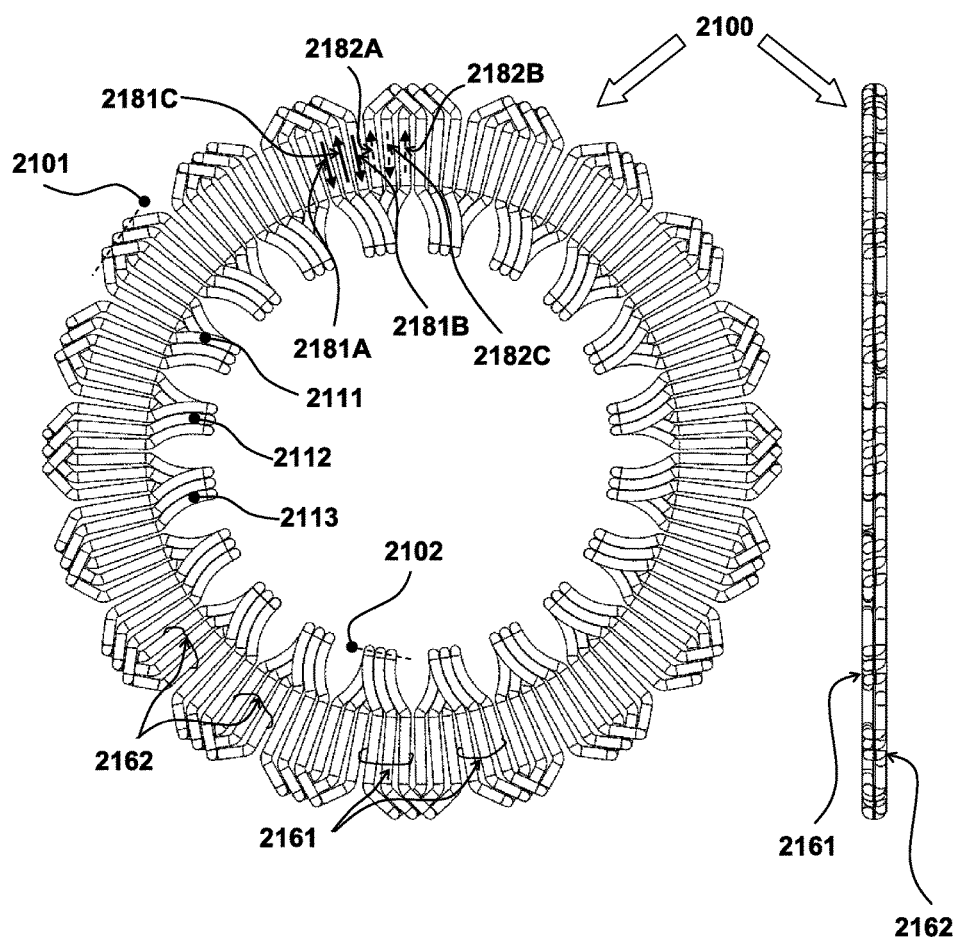
FIG. 8B shows front and profile views of the stator winding of FIG. 8A, according to some embodiments of the present invention.

Attention is now drawn to FIG. 8A which is an isometric view of a 40-pole 3-phase stator winding structure (input and output are not shown), according to some embodiments of the invention. In these embodiments, three separate but grouped conductors (also called "conductor members" herein) are bent 20 times at an internal circular periphery of the winding and bent 20 times an external circular periphery of the winding, the bends being in a same direction, as described above. These conductor members may optionally be stranded wire and/or Litz wire. FIG. 8B shows front and profile views of the stator winding structure shown in FIG. 8A. As seen in the figures, an exemplary stator winding 2100 is made from separate conductors 2111, 2112, 2113 which are wrapped 20 times about an external periphery (lines 2101) and 20 times about an internal periphery (lines 212), wrapping being always in a same direction. The winding comprises upper layer sections 2161 and lower layer sections 2162. (The terminal ends are not visible in the figure. The straight active current paths 2181 A, B, C directed approximately outward from the geometric center of the structure and straight active current paths 2182 A, B, C directed approximately toward the geometric center of the structure form together a 40-pole (20-pole pair) winding.

It is noted that in this and other figures herein, the traces of the winding conductors are exemplary and not to be considered limiting. In particular, in the exemplary embodiment shown in FIG. 8A the directions of the bends of the windings at the inner and outer peripheries are always the same (i.e. always clockwise or always counter-clockwise), and indeed this arrangement provides advantages of spatial efficiency, however alternating directions, or other combinations of directions, are also contemplated.

Figure 9:
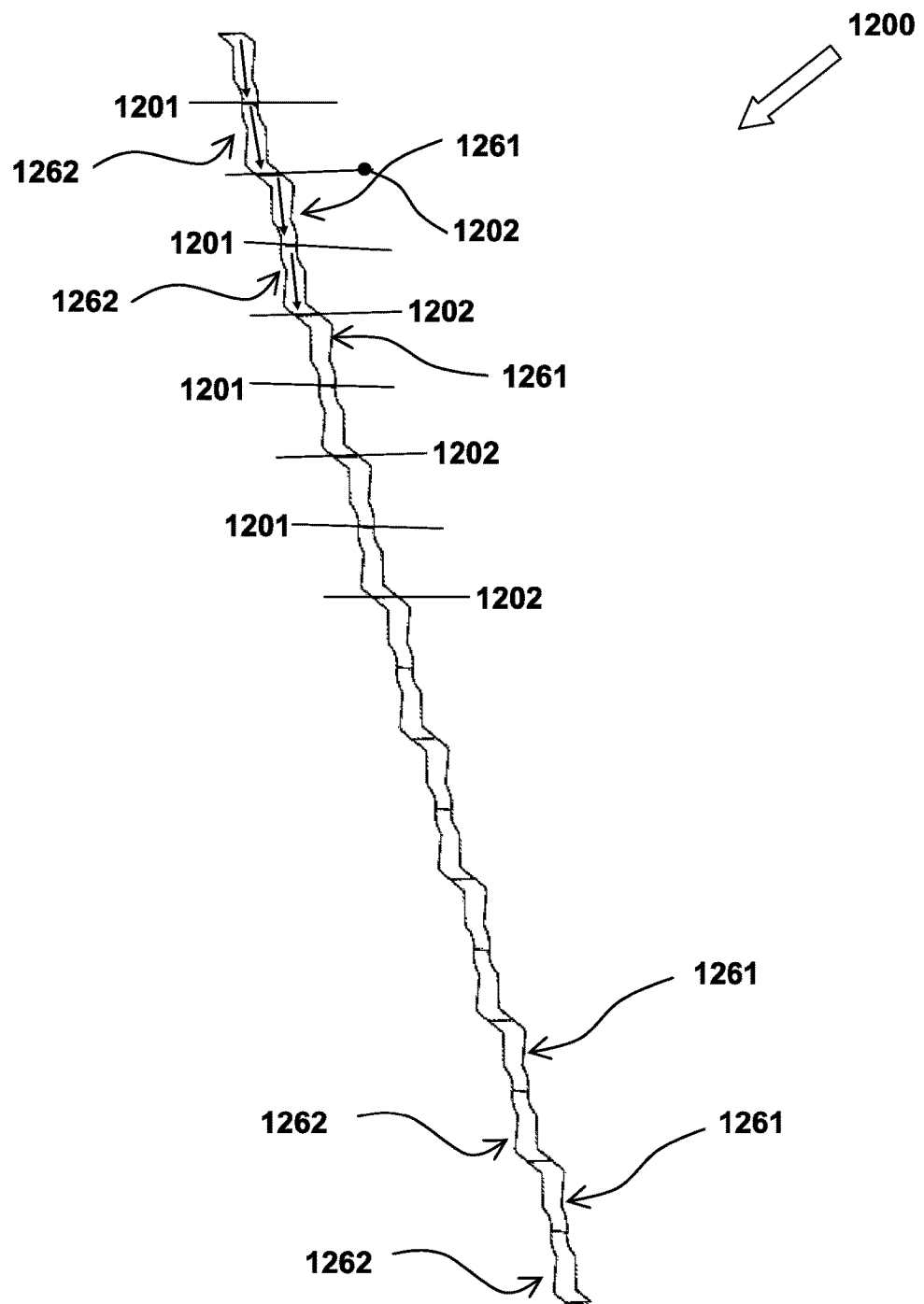
FIG. 9 is a partial top view of a flat variable-width cable used in the stator winding structure of FIG. 7, according to some embodiments of the present invention.

Attention is now drawn to FIG. 9, which is a partial top view of a flat variable-width cable (e.g. cable 1200) used in the stator winding structure disclosed in FIG. 7, according to some embodiments of the present invention. The figure shows a variable-width cable-like structure which can be used to build a stator 1200 shown in FIG. 7, shown in FIG. 9 as it might appear prior to being wrapped to build the stator. The bending positions (positions where the cable is bent to form external and internal peripheries 1201 and 1202), as well as lower and upper layer sections 1261 and 1262, alternate as marked in the figure. Optional exemplary dimensions and descriptions of several section types appearing in the exemplary cable 1200 shown in the figure were discussed above in the context of discussion of FIG. 7.

Figure 10:
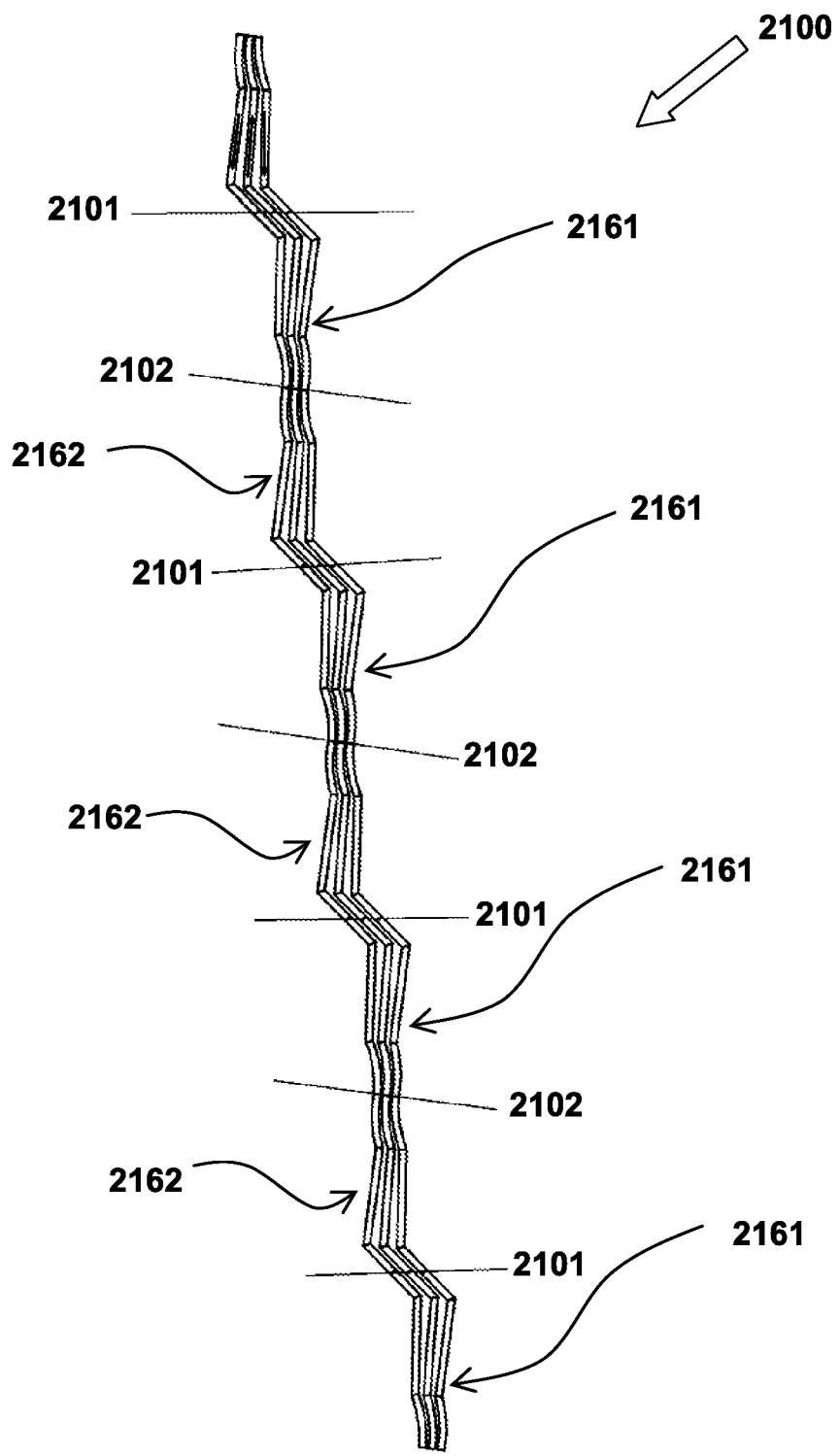
FIG. 10 is a partial top view of the 3-phase stator winding cable used in the stator winding structure of FIG. 8A, according to some embodiments of the present invention.

Attention is now drawn to FIG. 10, which is a partial top view of a 3-phase stator winding structure disclosed in FIG. 8A, shown in FIG. 10 in its form prior to being wrapped to form the stator. The bending lines of external and internal peripheries 2101 and 2102, as well as lower and upper layer sections 2161 and 2162, alternate as shown in the figure. The windings are optionally presented as a cable of isolated but physically connected conductors. Optionally, dimensions of isolating elements may be minimized, and/or some or all of said connected conductors can present a flat shape and/or a trapezoidal central section, optionally creating a nearly continuous conductive surface across the winding. For example, metallic or other conductor coverage could be greater than 80% of the plane comprising the active elements, or greater than 90%, or greater than 95%.

Figure 11A:
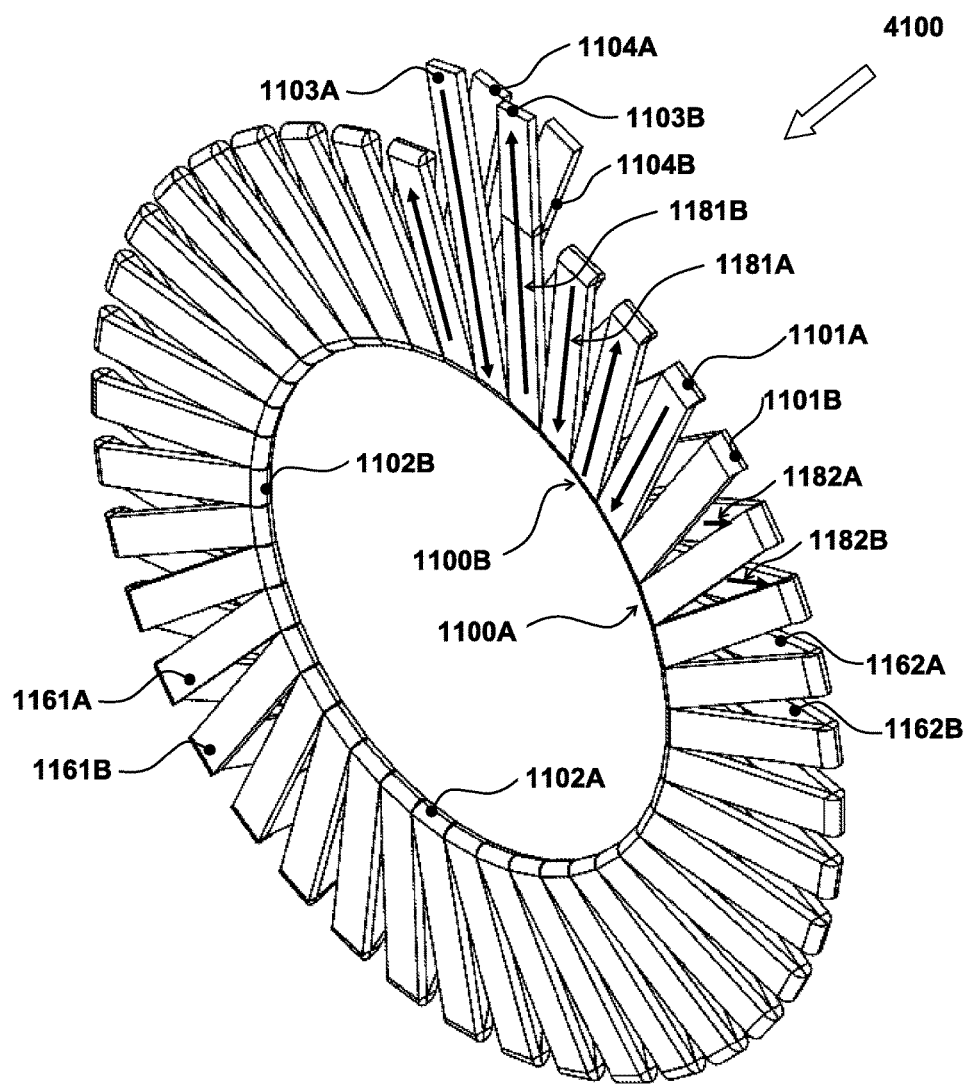
FIGS. 11A and 11B are views of a 40-pole stator comprising two stator winding structures each similar to that shown in FIG. 6, according to some embodiments of the present invention.
Figure 11B:
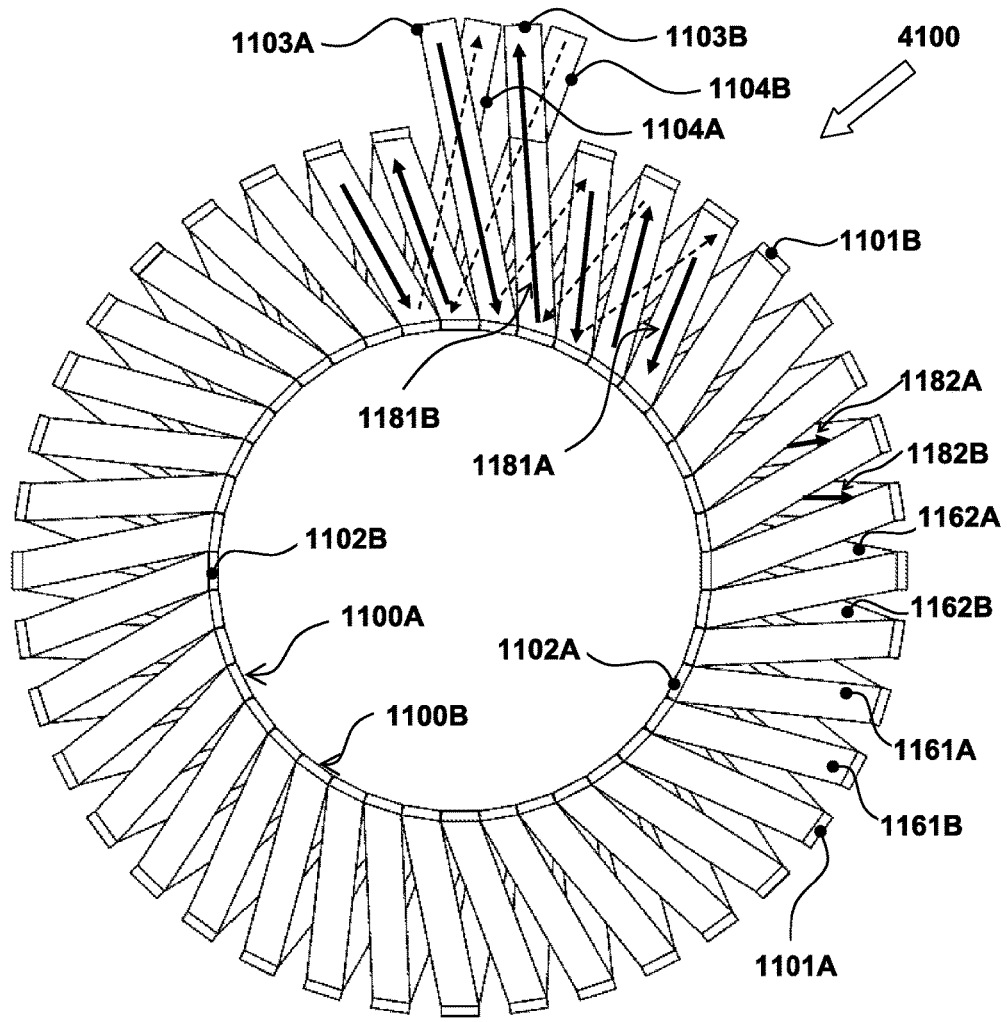

Attention is now drawn to FIGS. 11A and 11B, which are isometric and front views respectively of an exemplary 40-pole (20 pole pair) stator comprising two of the stator winding structures shown in FIG. 6, according to embodiments of the present invention. A stator 4100 consists of two identical stator windings 1100A and 1100B, each structured as shown in FIG. 6. Windings 1100A and 1100B are interlaced to form a compact planar stator construction. Each of the windings comprises 20 wrappings around an external periphery (lines 1101A, 1101B) and 20 wrappings around an internal periphery (lines 1102A, 1102B), with bendings each time in a same direction. In this manner, upper layer sections 1161A and 1161B, and lower layer sections 1162A and 1162B are formed. Terminal ends 1103A, 1103B, 1104A, and 1104B may be seen in the figure. The straight current paths 1181A and 1181B directed respectively outward from the structure's geometric center together with current paths 1182A and 1182B directed respectively inward approximately toward the structure's geometric center forming a 40-pole (20-pole pair) winding. Combining the two windings 1100A and 1100B creates a spatially efficient stator.

In an exemplary embodiment, if "d" is the external stator diameter, eps is the inner-to-outer stator diameter ratio (typically between 0.45 and 0.65) and p is the number of pole pairs (e.g. 20, as shown in an exemplary embodiment in the figure) then the cable width is approximately $eps*\pi d/(2p)$.

Figure 12:
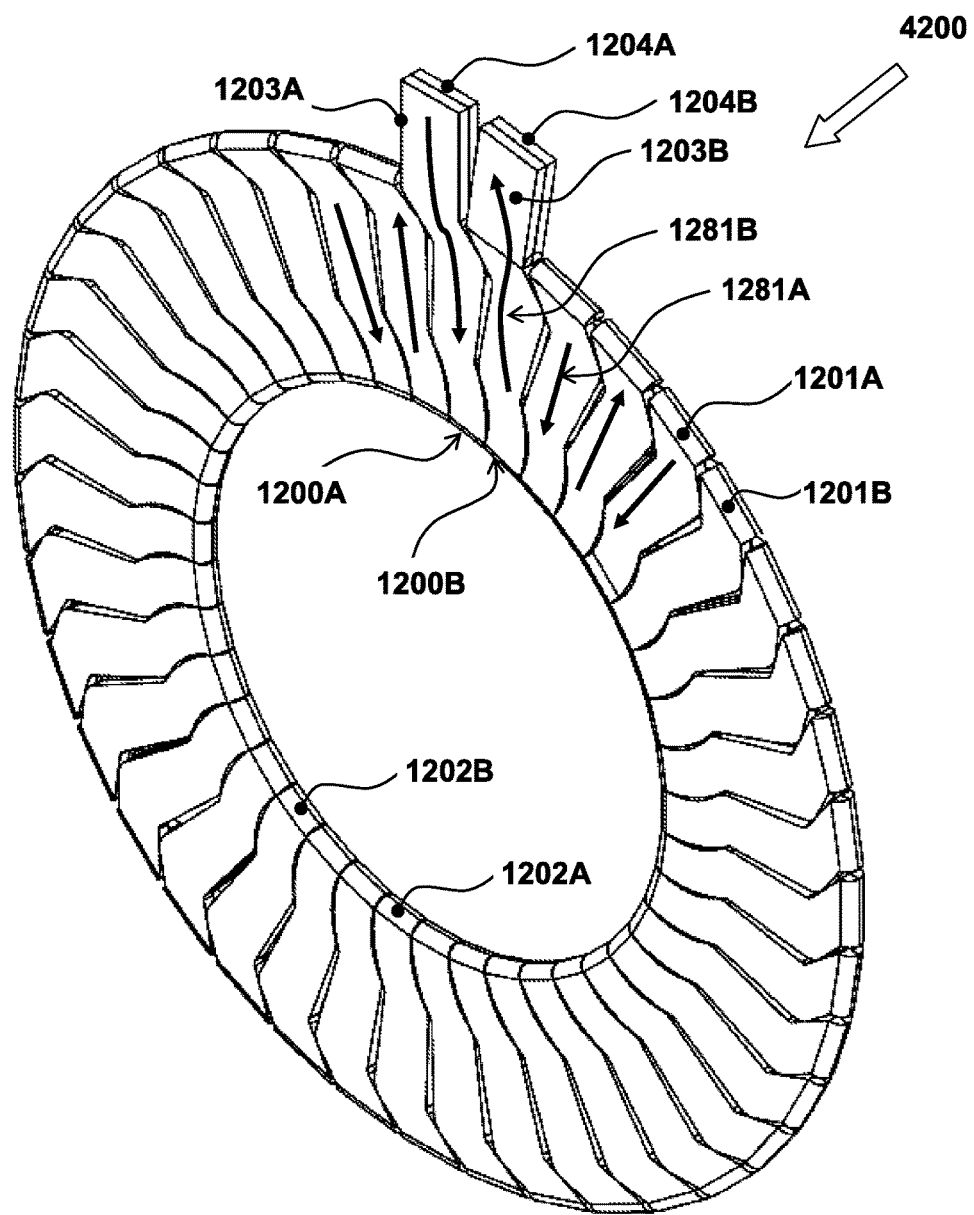
FIG. 12 is an isometric view of a 40-pole coreless stator comprising 2 stator winding structures similar to that shown in FIG. 7, according to an embodiment of the present invention.

Attention is now drawn to FIG. 12, which is an isometric view of a 40-pole coreless stator comprising two of the stator winding structures disclosed in FIG. 7, according to some embodiments of the present invention. FIG. 12 shows a stator 4200 which comprises two optionally identical stator windings 1200A and 1200B, each of which is optionally a winding structure as shown in FIG. 7. As shown in the figure, windings 1200A and 1200B combine into a compact planar construction with a very efficient use of available space. As may be seen from inspection of the figure, the stator is circular and flat. (Note that because of an optical illusion the surface pictured may not appear to be flat, but a flat surface comprised of segments of a bent conductor (bent at the peripheries, not between them) is described here and as comprised in some embodiments of the invention. It may be noted that the individual segments have a geometry which permits active segments to be at or to approach a radial orientation (for enhanced efficiency) while diagonal (with respect to the radius) connecting sections near the peripheries move the winding sideways in an amount calculated to displace the winding sideways for a distance which enables a next winding to not overlap.

Understanding that the disk-like shape shown in the figure is flat, it may be appreciated that the resultant structure is a close approximation of a solid substantially flat circular disk (i.e. a very short truncated cylinder). Such a structure might be, for example, encased in a disk-shaped casing having the form of a (wide and very short) truncated cylinder. If we were to define a "containing cylinder" as the smallest cylinder which could so contain the wound apparatus, it is clear from the figure that most of that volume would contain material of the wound conductor.

In other words, there is very little wasted space: most of the space required to position the embodiment shown in FIG. 12 (as well as other embodiments presented herein) is occupied by conducting material. In some embodiments a wound apparatus comprises a wound conductor and material of said wound conductor occupies more than 75% of the smallest cylindrical volume which contains said apparatus. This is an advantage of embodiments of the present invention not known in the art. In some embodiments more than 85% of the volume is so occupied. In some embodiments more than 90% of the volume is so occupied. In some embodiments more than 95% of the volume is so occupied.

In some embodiments, an embodiment as shown in FIG. 12 is included as a stator in an electric machine, and the wound conductor shown in the figure is positioned to intersect more than 75% (or, alternatively, more than 85% or more than 95%) of lines of flux originating at a rotor of that machine.

The resultant space efficiency of the wound apparatus shown in FIG. 12 and other figures herein enables construction of efficient machines and small machines, and can provide spatial efficiencies in other contexts (for example, as an antenna of a portable electronic device such as a cell phone).

In an exemplary embodiment shown in the figure, each winding structure is wrapped 20 times to form an external periphery (lines 1201A and 1201B) and wrapped 20 times to form an internal periphery (lines 1202A, 1202B). As seen clearly in FIG. 7, stator 4200 comprises upper layer sections, lower layer sections, and terminal ends 1203A and 1204A and terminal ends 1203B and 1204B. The straight current paths 1281A and 1281B directed approximately outward from the center of stator 4200 with current paths directed approximately inward to the center of the structure (not designated here) together a form a 40-pole pair winding.

Figure 13:
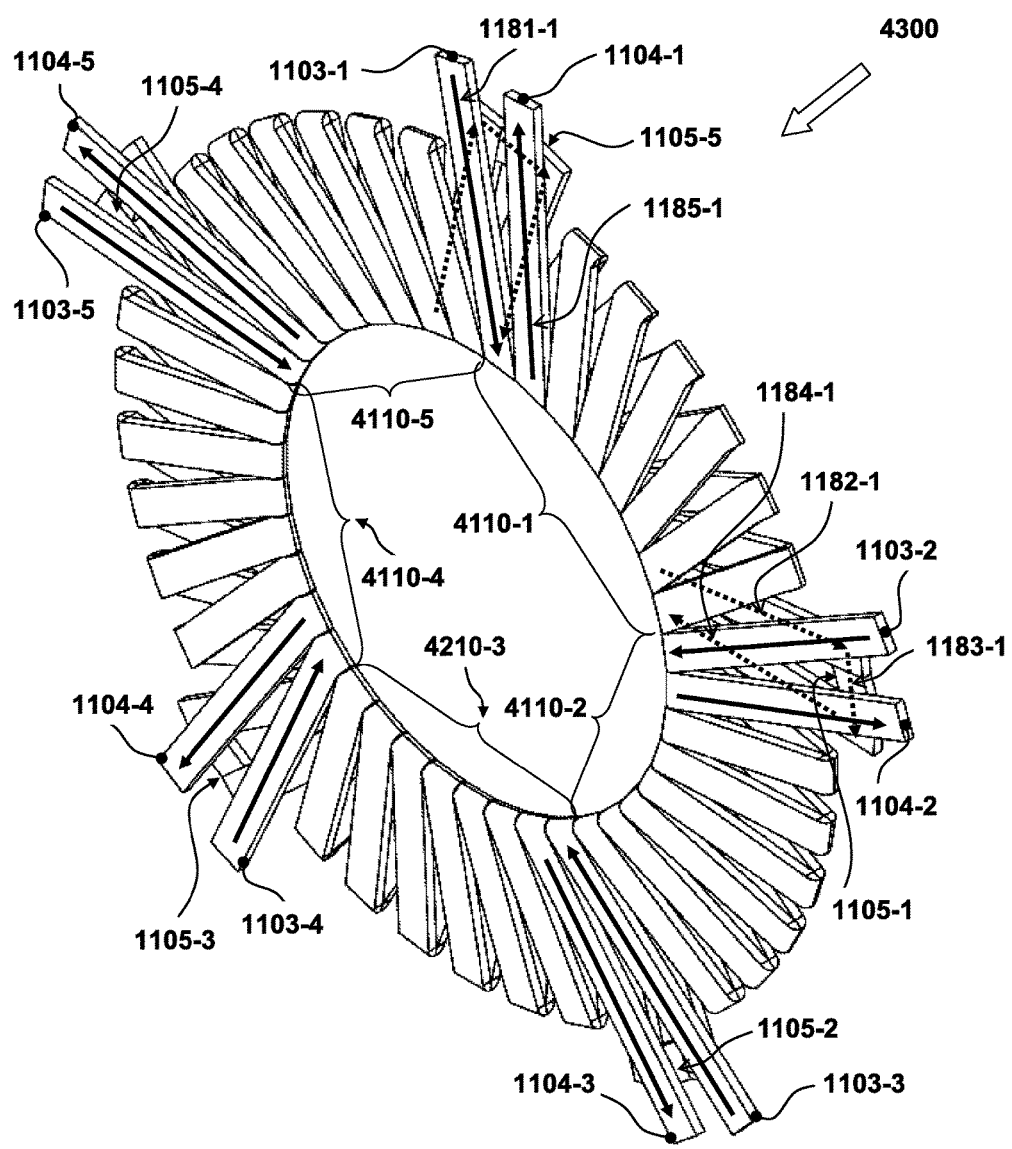
FIG. 13 is an isometric view of a 40-pole stator comprising winding structures similar to that shown in FIG. 6, but divided into 5 identical sectors each comprising 8 poles, according to some embodiments of the present invention.

Attention is now drawn to FIG. 13, which is an isometric view of an exemplary 40-pole stator winding structure which is similar to that disclosed in FIG. 6, but differs therefrom in that it is divided into five substantially identical sectors, each independently electrically connected and each comprising eight poles (four pole pairs). (The number "five" is exemplary, not limiting. Other numbers of poles and/or other numbers of sectors are also contemplated.) FIG. 13 shows a stator 4300 which is similar to that of FIGS. 11A-B, but comprises independent sectors 4110-1, 4110-2, 4110-3, 4110-4, 4110-5 each having its own terminals 1103-1, 1103-2, 1103-3, 1103-4, 1103-5 and 1104-1, 1104-2, 1104-3, 1104-4, 1104-5 respectively. The current in each sector 4110 (e.g. in 4110-1) starts to flow from terminal 1103 (e.g. 1103-1) through path 1181 (e.g. 1181-1) reaches the last sector path 1182 (e.g. 1182-1), makes a closure through the section 1105 (e.g. 1105-1), starts to come back in path 1183 (e.g.1183-1) and closes loop in path 1184 (e.g. 1184-1) in terminal 1104 (e.g. 1104-1). Such a winding topology makes it possible to adapt the device it for differing voltage/current requirements by modifying series-or-parallel segment connections. For example, for high voltage-low current applications the sectors may be connected in series while for low voltage-high current applications the sectors may be connected in parallel.

Stators disclosed in FIGS. 11-13 comprise two individual windings wrapped to together. This arrangement is efficient but requires a combined wrapping process of two independent conductor structures (e.g. flat cables), which may require a complex manufacturing process.

Figure 14A:
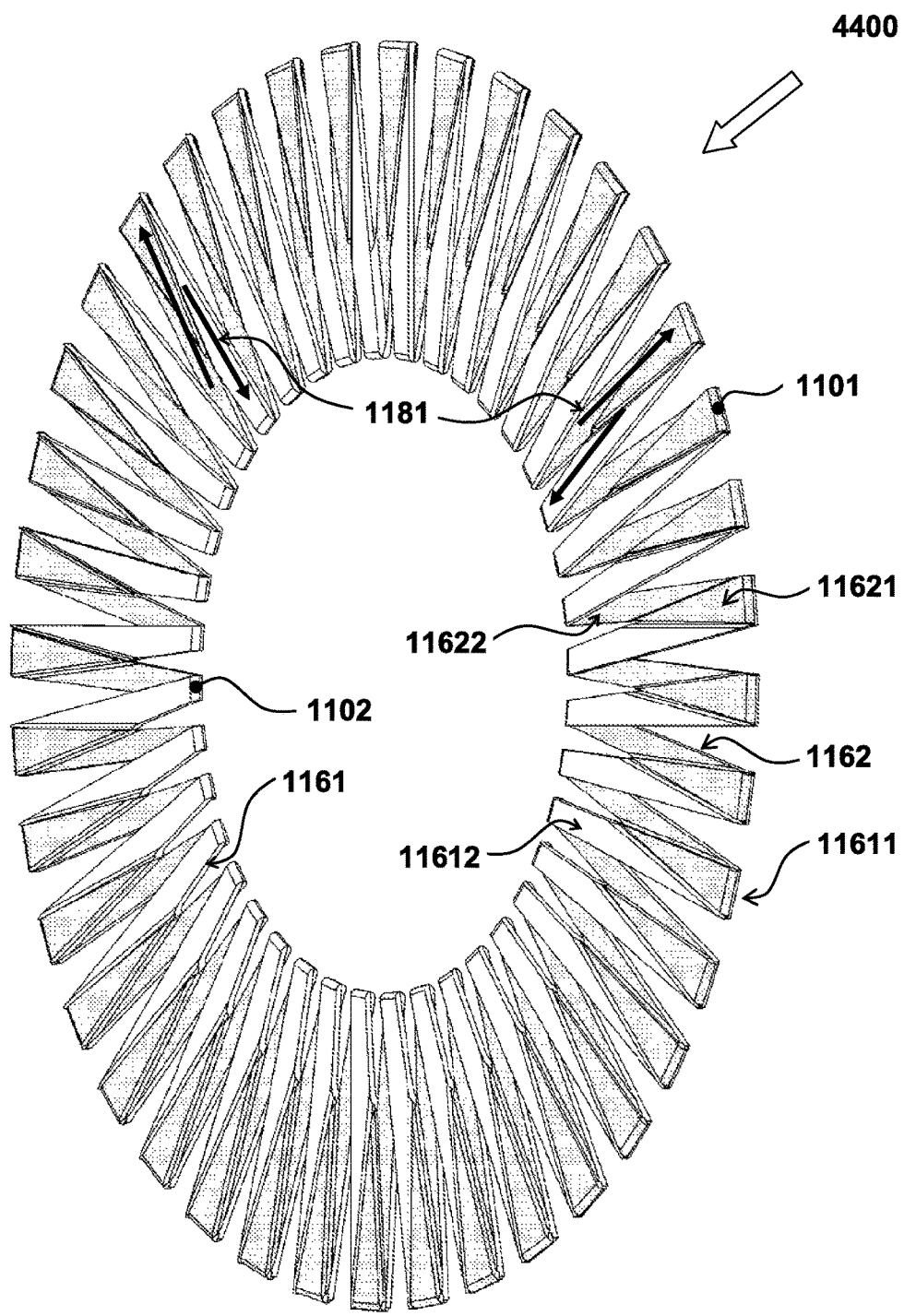
FIG. 14A s an isometric view of a stator winding structure comprising a flat variable-width flexible cable bent 20 times in a first direction at its internal circular periphery and bent 20 times at its external circular periphery in a second and opposite direction, according to some embodiments of the present invention.
Figure 14B:
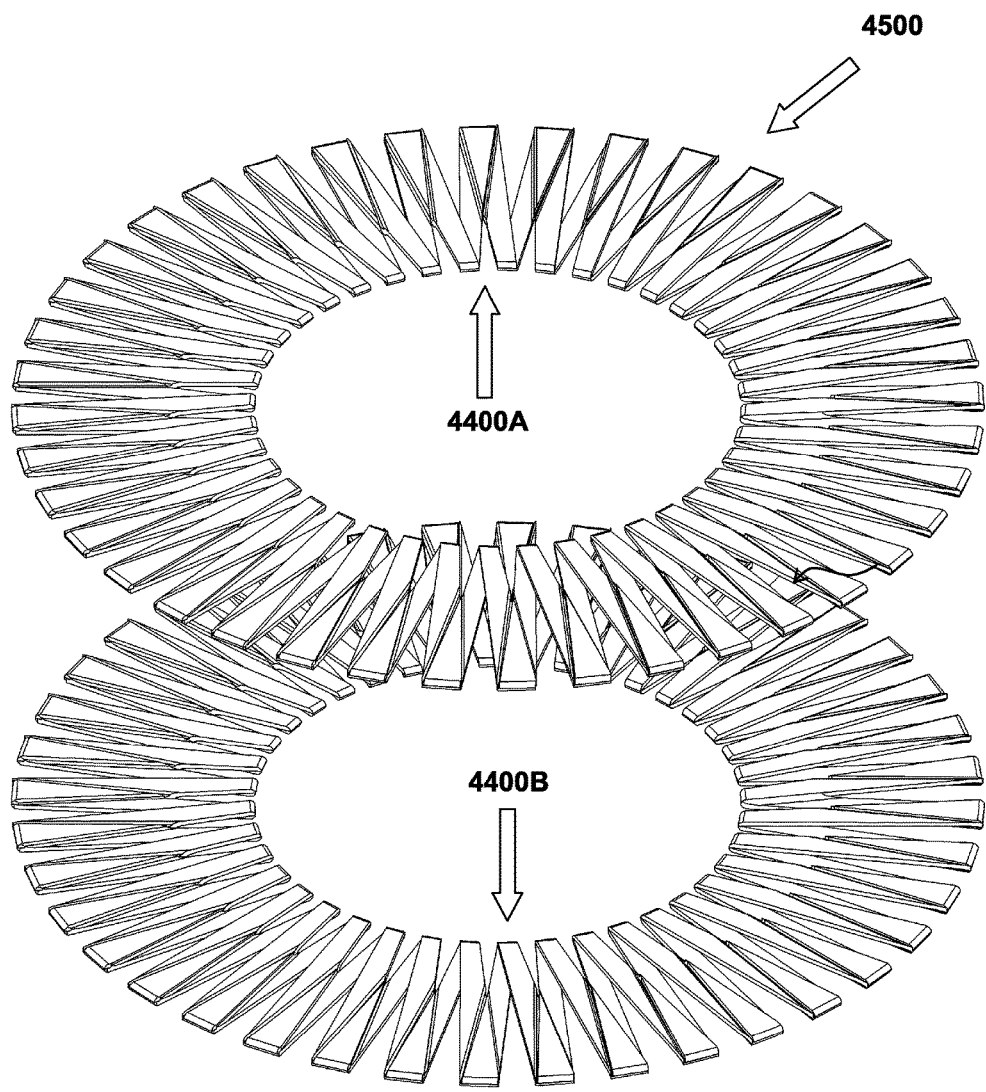
FIG. 14B shows two windings similar to that shown in FIG. 14A, used in combination, according to some embodiments of the present invention.

An alternative configuration which enables using two independently wrapped windings which can be simply stacked against each other is shown in FIGS. 14A and 14B, which are isometric views of a stator winding structure according to some embodiments of the invention. In this exemplary implementation, a flat variable-width flexible cable is bent 20 times in its internal circular periphery and 20 times in its external circular periphery, but the bends are in opposite directions (e.g. clockwise at the internal periphery and counter-clockwise at the external periphery, or vice versa).

As seen in FIG. 14A, a two-layer 40-pole circular winding 4400 is wrapped from a variable-width cable-like conductor structure, which is bent 20 times around an external periphery in a first direction (e.g. clockwise), and 20 times around an internal periphery in a second direction (e.g. counter-clockwise), creating a zigzag winding. Here all radial sections do not lie in one layer (lower or upper) as they do as shown in FIGS. 11-13, but rather translate from upper layer to lower layer, and back again from lower to upper. Sections 1162 (dark in the figure) include 2 portions: portion 11621 lying in the upper layer and portion 11622 lying in the lower layer. Sections 1161 include 2 portions: 11611 laying in the lower layer and 11612 laying in the upper layer.

FIG. 14B shows how two identical angle-shifted windings of the sort shown in FIG. 14A, here labeled 4400A and 4400B, may be simply stacked one on another to build a stator 4500.

Figure 15:
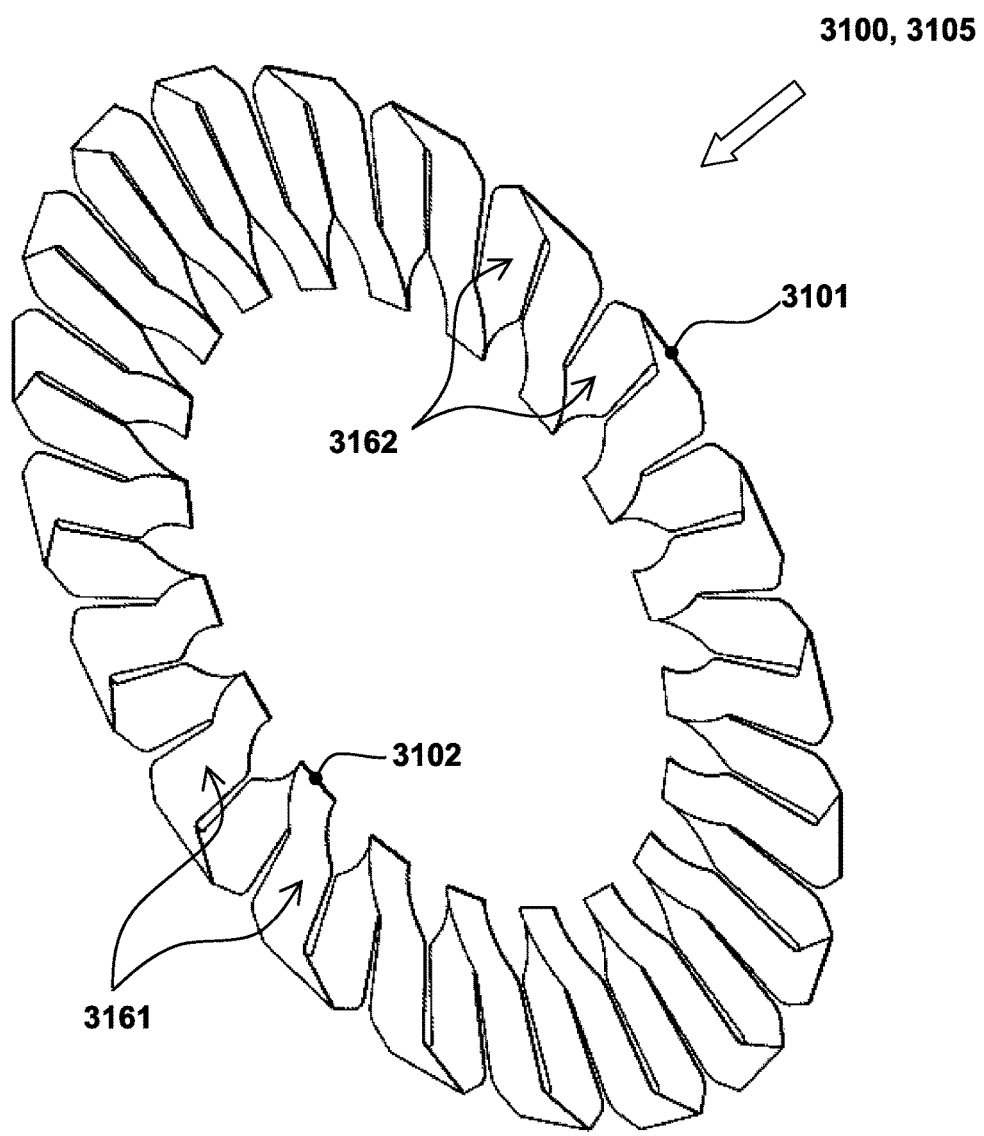
FIG. 15 is an isometric view of a variable-width flexible substrate bent 20 times at its internal circular periphery and bent in a same direction 20 times at its external circular periphery, useable to support stator winding structures, according an some embodiments of the present invention.
Figure 16:
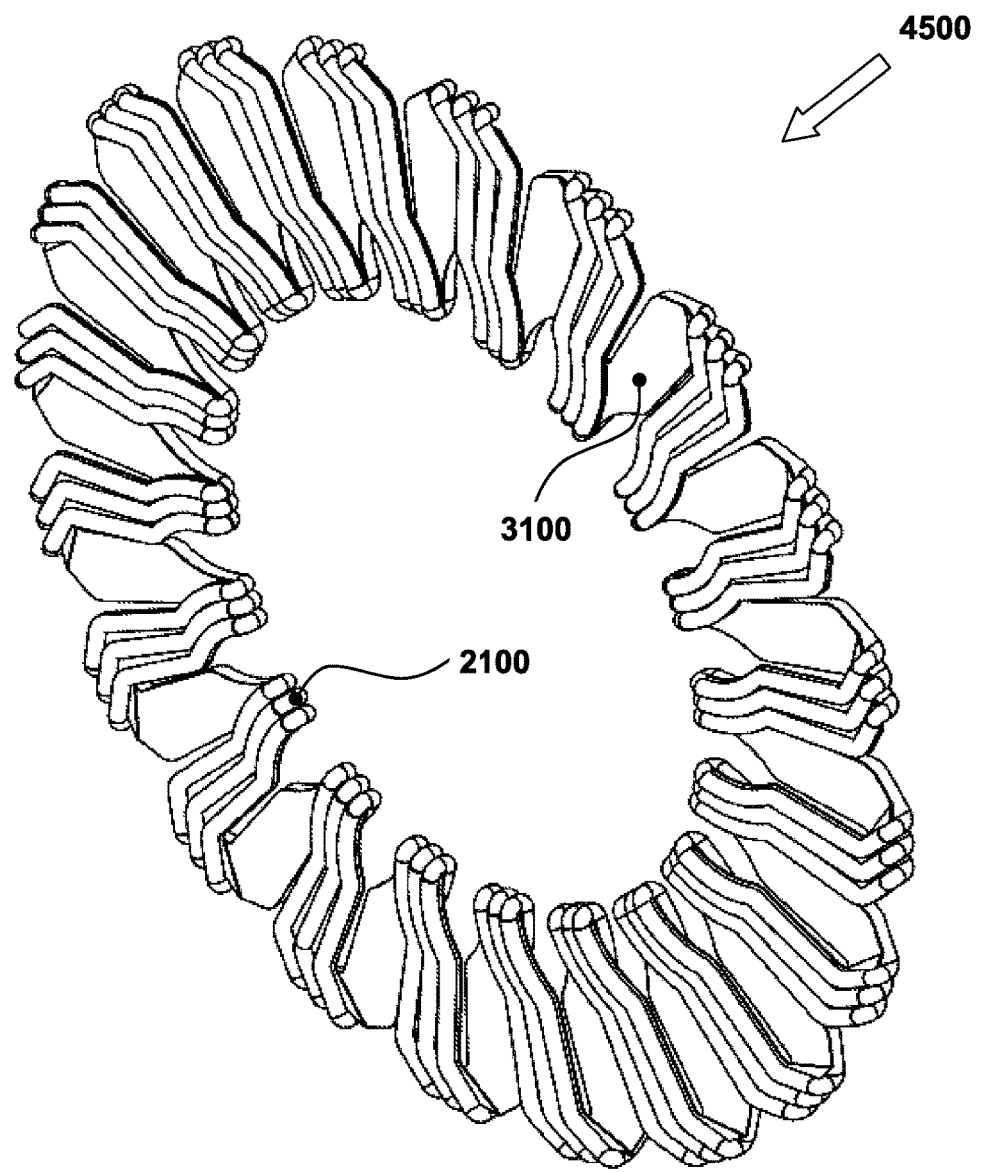
FIG. 16 is an isometric view of a 3-phase stator winding structure (input and output are not shown) comprising 3 mutually spaced conductors secured on a variable width substrate tape similar to that shown in FIG. 15, according to some embodiments of the present invention.

Attention is now drawn to FIG. 15, which is an isometric view of a variable-width wrapped flexible substrate 3100, according to some embodiments of the invention. Substrate 3100 is optionally bent 20 times in its internal circular periphery and 20 times in its external circular periphery, optionally in a same direction. (The number of bends show is exemplary, not limiting.) Substrate 3100, optionally an adhesive tape 3105, may be used to support and consolidate stator winding structures such as those shown in FIG. 7, and others presented herein. Bending lines 3101 and 3102 of the substrate coincide at least approximately with bending points in the stator structure, whose bending points are shown in FIG. 7 and discussed above. In some embodiments, adhesive surfaces 3161 and 3162 provide for gluing (or otherwise fixating) stator windings 2100. An example of such use is shown in FIG. 16, which shows structure 3100 (optionally adhesive tape 3105) used to hold windings similar to those shown in FIG. 8A, according to an embodiment of the present invention. Stator conductors such as those shown in many of the preceding figures may be secured onto substrate 3100, resulting in a rigid construction of a stator 4500. In some embodiments, a flat conductor may be combined with an adhesive substrate to form a flat bendable conductor with an adhesive backing on one of its flat sides. In some embodiments, a self-bonding substrate is used.

In some embodiments, substrate 3100 may comprise or connect to a ferromagnetic material, for example a ferrite material. In some embodiments substrate 3100 is presented with an adhesive on one face and a ferromagnetic material on another face.

Figure 17:
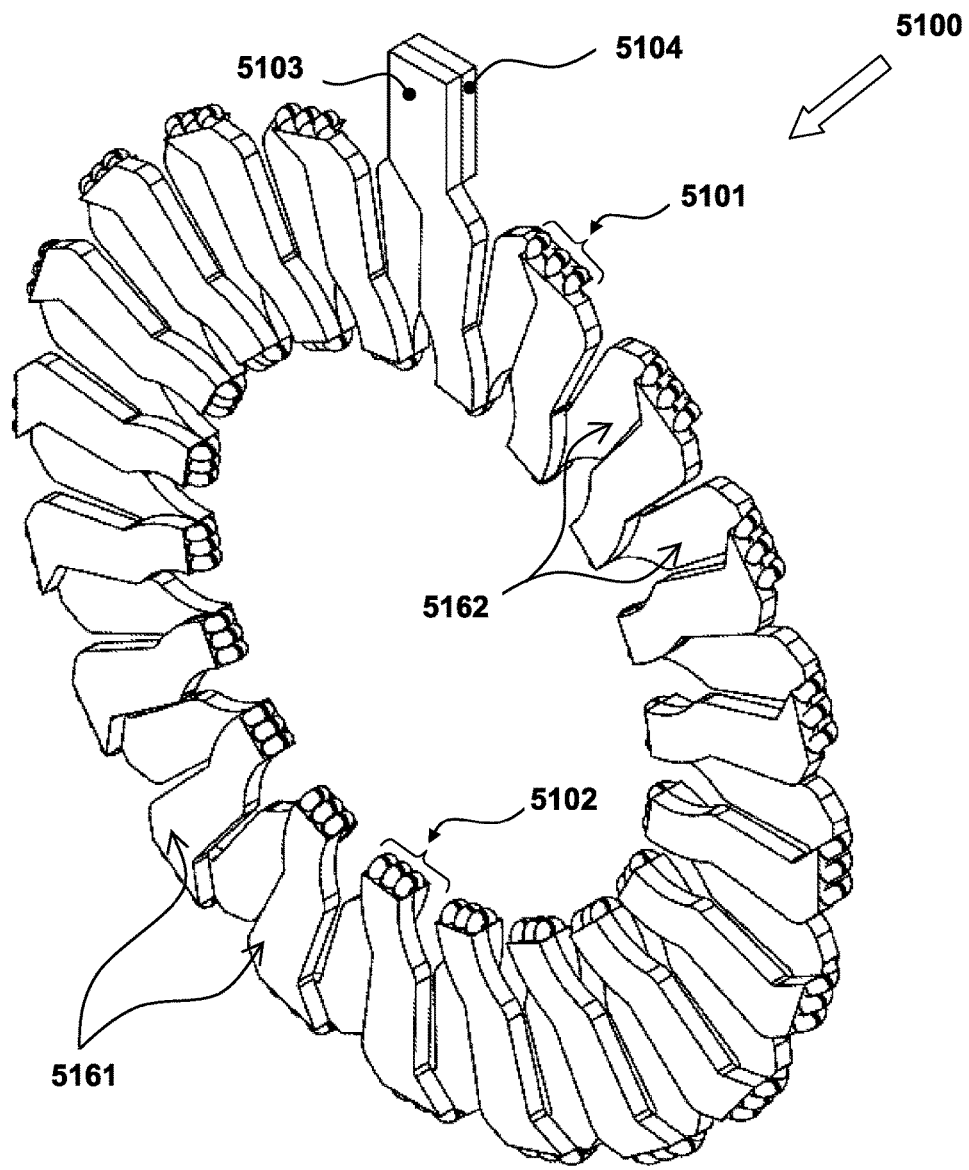
FIG. 17 is an isometric view of a 3-phase stator winding structure which comprises a chain comprising 40 solid flat links, the chain being bent 20 times at its internal circular periphery and bent 20 times in its external circular periphery, according to some embodiments of the present invention.

Attention is now drawn to FIG. 17, which is an isometric view of a 3-phase stator winding structure according to some embodiments of the present invention. In this exemplary embodiment the stator is made from a chain comprising 40 solid flat links, bent 20 times at an internal circular periphery and 20 times at an external circular periphery. Circular stator structure 5100 is made as a chain consisting of 40 rigid sections 5161 (upper layer) alternating with rigid sections 5162 (lower layer) and bent 20 times at a flexible external periphery (label 5101) and 20 times at an internal periphery (label 5102). Rigid sections 5161, 5162 are conductor sections encapsulated and/or potted and/or cast, and/or otherwise made rigid. Flexible peripheral sections (e.g. at 5120 and 5102) are short conductor sections free from encapsulating material.

Figure 18A:
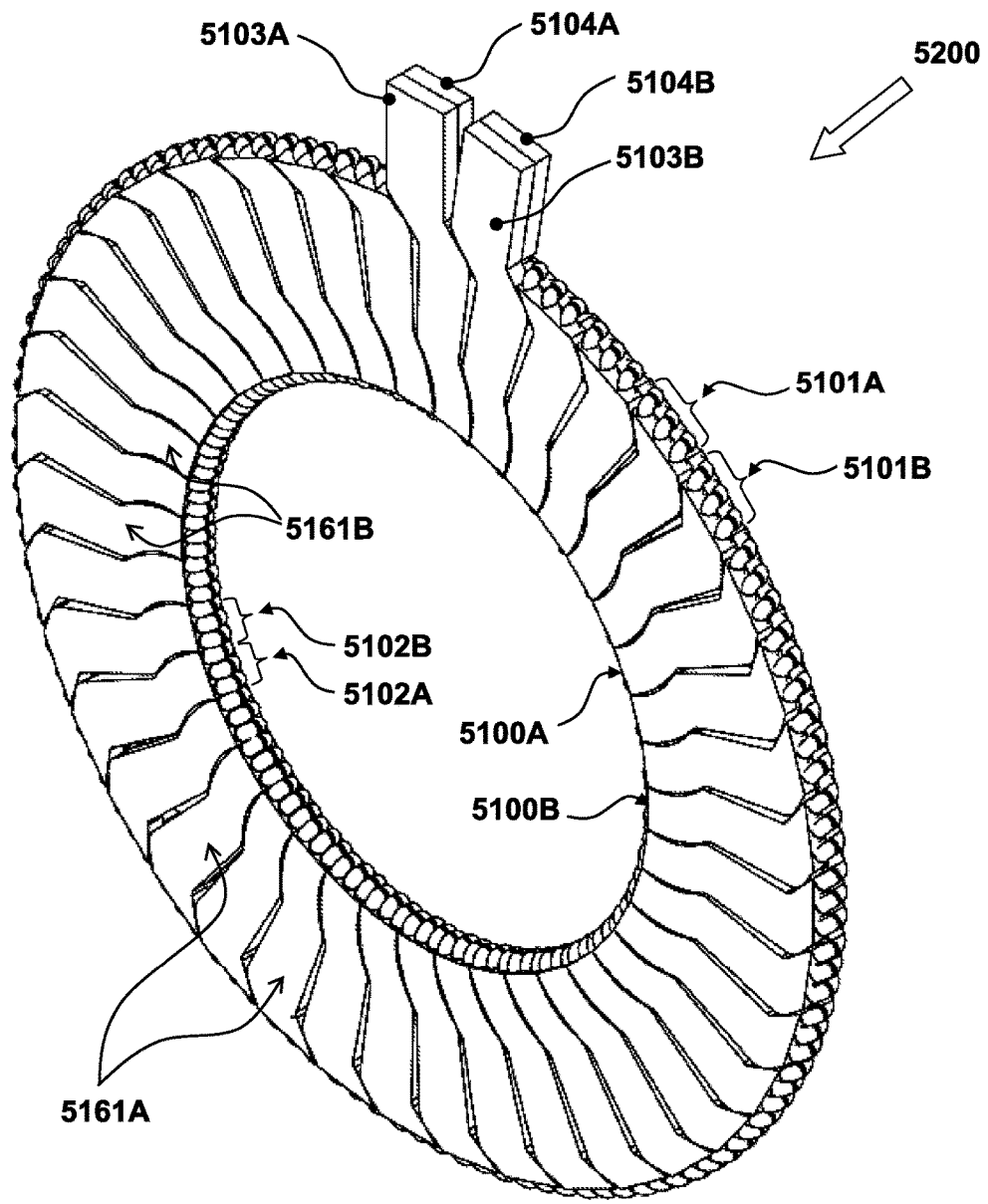
FIGS. 18A and 18B are views of a 40-pole 3-phase coreless stator comprising two winding structures similar to that shown in FIG. 17, interleaved, according to some embodiments of the present invention.
Figure 18B:
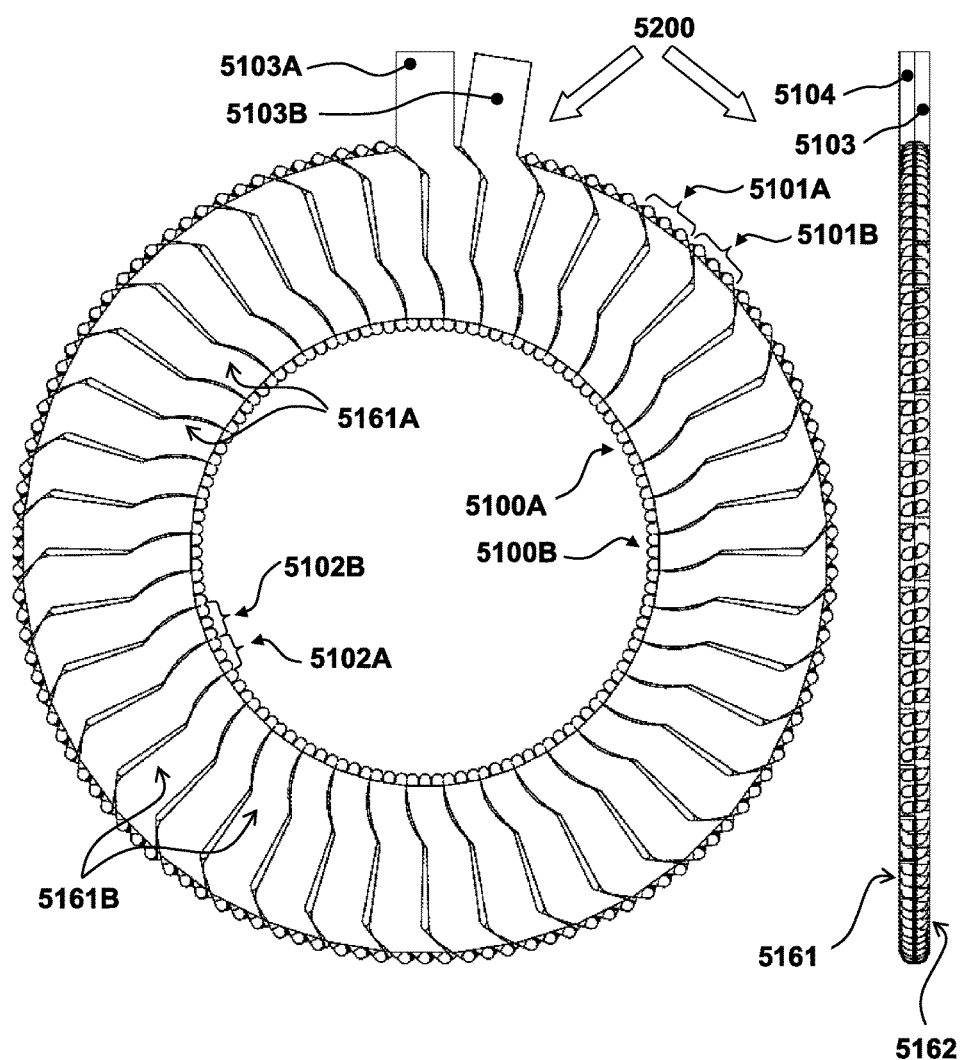

FIG. 18A is an isometric view of a 40-pole 3-phase coreless stator comprising winding structures disclosed in FIG. 17, according some embodiments of the present invention. FIG. 18B presents front and profile views of the same structure. FIGS. 18A and 18B show a stator 5200 which consists of two identical stator windings 5100A and 5100B, each as shown in FIG. 16. Together, they form a compact planar construction with high efficiency in the use of space, as may be seen from the figure. In the exemplary embodiment shown, each section is wrapped 20 times around an external periphery (in flexible sections (labels 5101A and 5101B) and 20 times around an internal periphery (in flexible sections labeled 5102A and 5102B). Stator 5200 comprises rigid upper layer sections 5161A and 5161B, rigid lower layer sections 5162A and 5162B and terminal ends 5103A and 5104A, and 5103B and 5104B.

Figure 19:
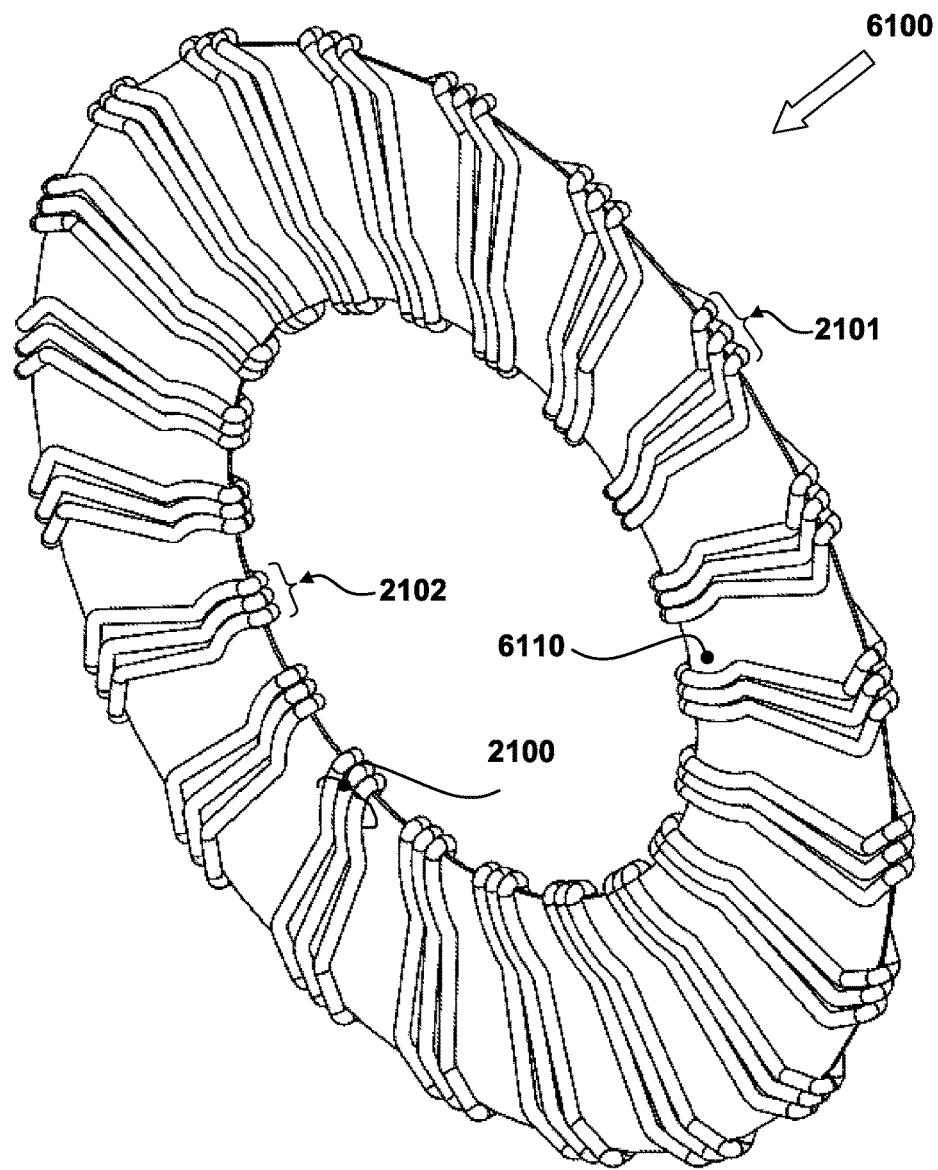
FIG. 19 is an isometric view of a 40-pole 3-phase stator winding structure (input and output are not shown) comprising 3 mutually spaced conductors wrapped around a central thin disk member, according to some embodiments of the present invention.

Attention is now drawn to FIG. 19, which is an isometric view of a 40-pole 3-phase stator winding structure (input and output are not shown) made from three spaced conductors wrapped around a central thin disk member, according to some embodiments of the present invention.

FIG. 19 shows an exemplary stator structure 6100 in which three separated mutually spaced conductors 2100 are wrapped (40 times, in this exemplary figure) around a central thin disk member 6110, the conductors being bent at external periphery places 2101 and at internal periphery places 2102 (one of each are labeled on the figure). Optionally, conductors 2100 may be glued onto central member 6110. Optionally, disk member 6110 may comprise a ferromagnetic material, such as a ferrite.

Figure 20:
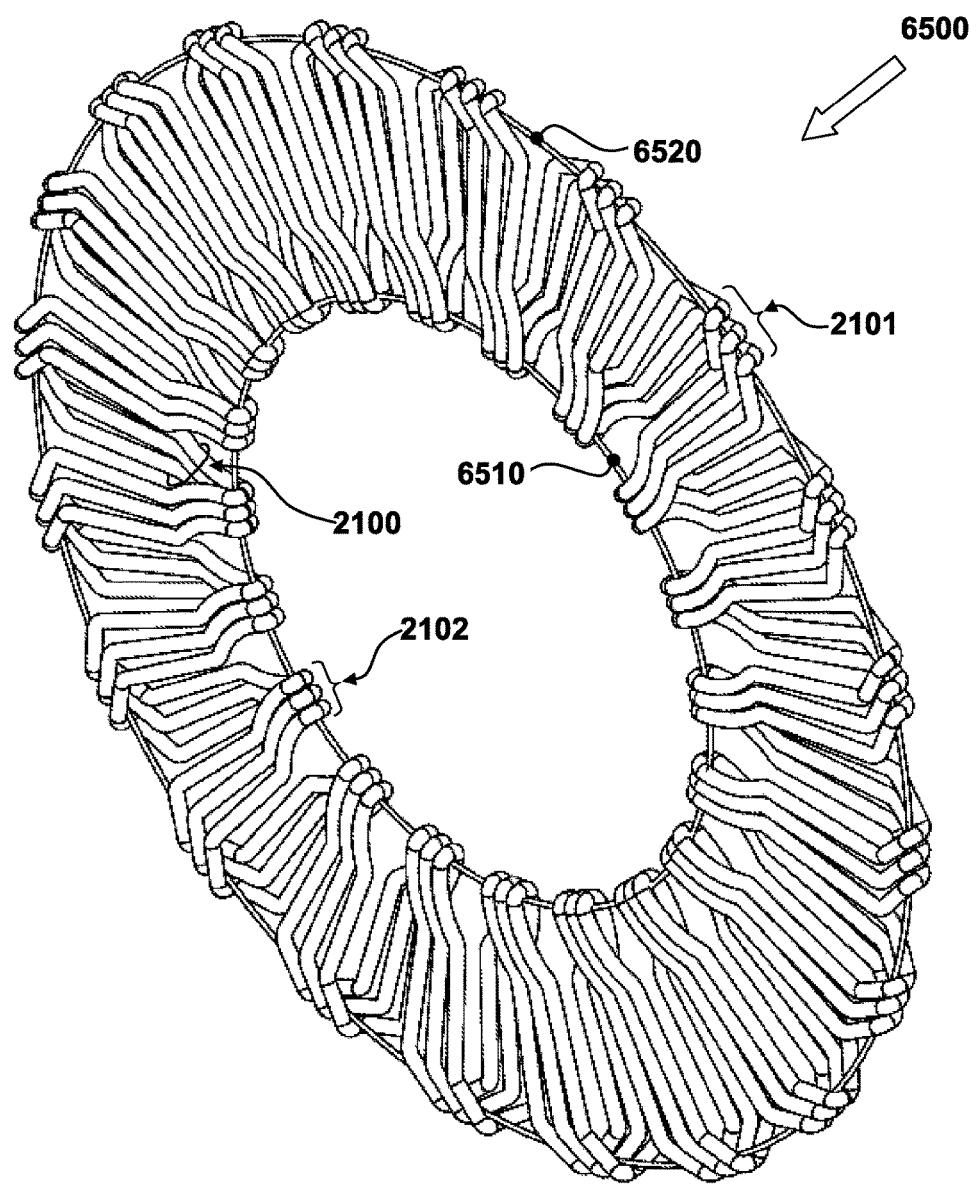
FIG. 20 is an isometric view of a 40-pole 3-phase winding structure (input and output are not shown) comprising three mutually spaced conductors wrapped around an internal thin ring to form an internal circular periphery of the winding, and wrapped around an external thin ring to form an external circular peripheries of the winding, according to some embodiments of the present invention.

Attention is now drawn to FIG. 20, an isometric view of a 40-pole 3-phase winding structure (input and output are not shown) according to some embodiments of the present invention. The figure shows three mutually spaced conductors 2100 wrapped around a thin internal ring 6510, thereby forming an internal circular periphery of the winding, and also wrapped around a thin external ring 6520, thereby forming an external circular periphery of the winding. Wrappings around internal ring 4210 may be seen at positions 2102. (For clarity, only one such position is labeled in the figure). Wrappings around external ring 4220 may be seen at positions 2101. (For clarity, only one such position is labeled in the figure).

Figure 21A:
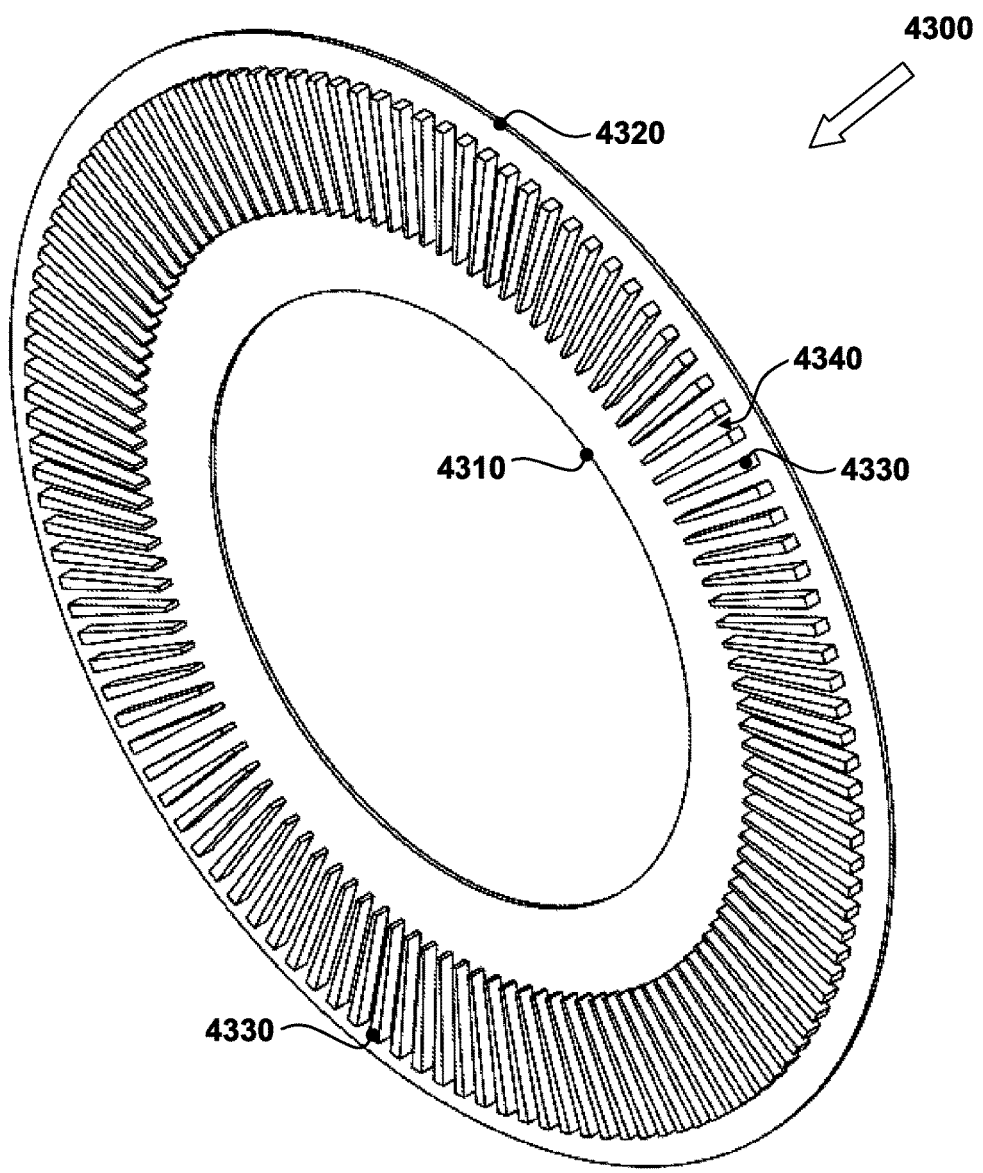
FIG. 21A is an isometric view of a central disk member around which a stator winding may be wrapped, the disk comprising a plurality of trapezoidal radial ribs which do not reach to the disk's internal and external peripheries, according to some embodiments of the present invention.
Figure 21B:
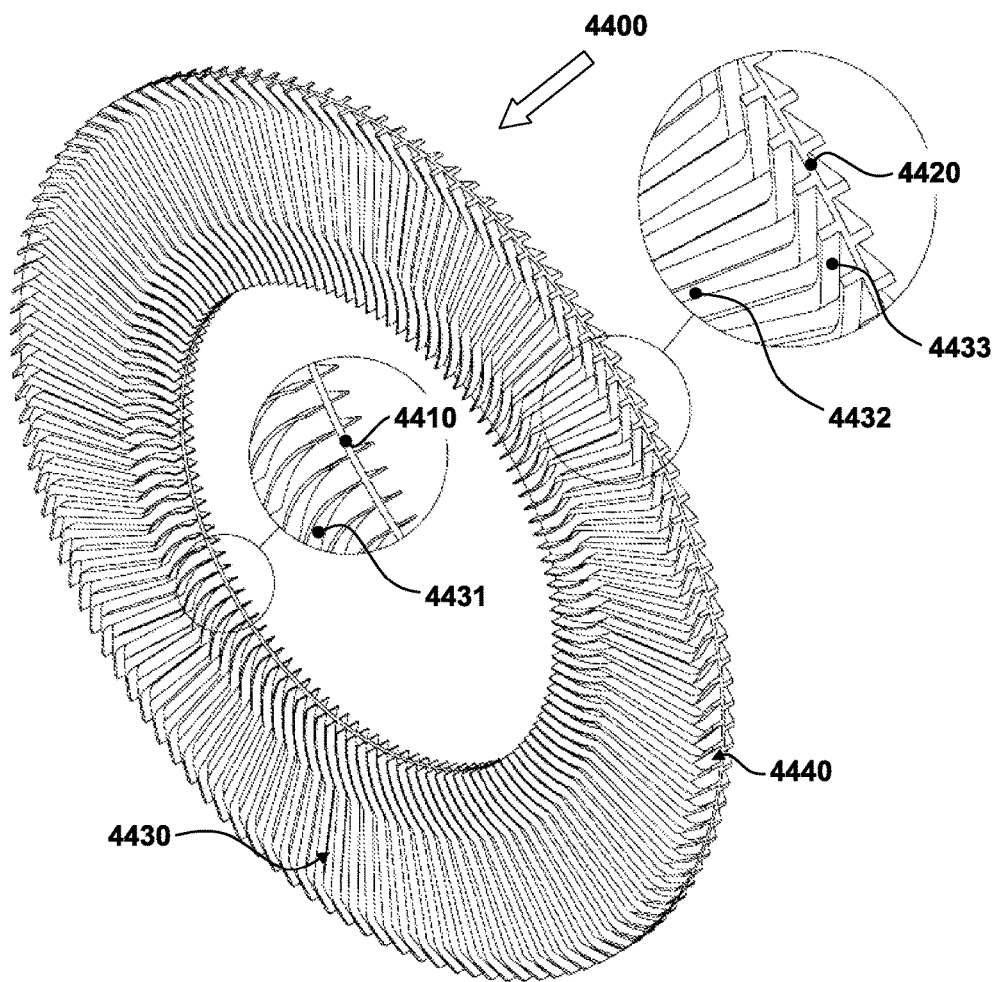
FIG. 21B is an isometric view of a central disk member around which a stator winding may be wrapped, the disk comprising a plurality of curved ribs extending to the disk's internal and external peripheries, according to some embodiments of the present invention.

Attention is now drawn to FIGS. 21A and 21B, which are isometric views of central disk members adapted for wrapping a stator winding structure around the structure, according to embodiments of the present invention. FIG. 21A presents a central disk 4300 having a plurality of trapezoidal radial ribs on the disk surface, the ribs not reaching to the disk's peripheries. FIG. 21B presents a central disk 4400 having a plurality of ribs which do stand between the disk's peripheries. The designs of FIGS. 21A and 21B may be used, for example, in the disk-using stator construction shown in FIG. 19.

FIGS. 21A and 21B both show thin disk cores with internal peripheries 4310/4410 and external peripheries 4320/4420, which carry multiple ribs, 120 in the exemplary embodiments shown in the figures. In disk member 4300, trapezoidal ribs 4330 do not reach the disk peripheries and form constant width straight slots 4340. In disk member 4400, ribs 4430 extend from inner peripheries 4410 to outer peripheries 4420, and form constant-width slots 4340. These ribs comprise trapezoidal sections 4432 forming straight slots (to secure active conductor sections), and internal peripheral curved sections 4431 and external peripheral curved sections 4433, to secure passive conductor sections. The curved slot sections 4431, 4433 serve to guide conductor sections near the external and internal peripheries. (It is to be noted that the detailed constructed forms shown in the figures and described above are exemplary only, and not to be considered limiting. Additional rib formations are contemplated, and are included in the scope of the invention.)

Figure 22:
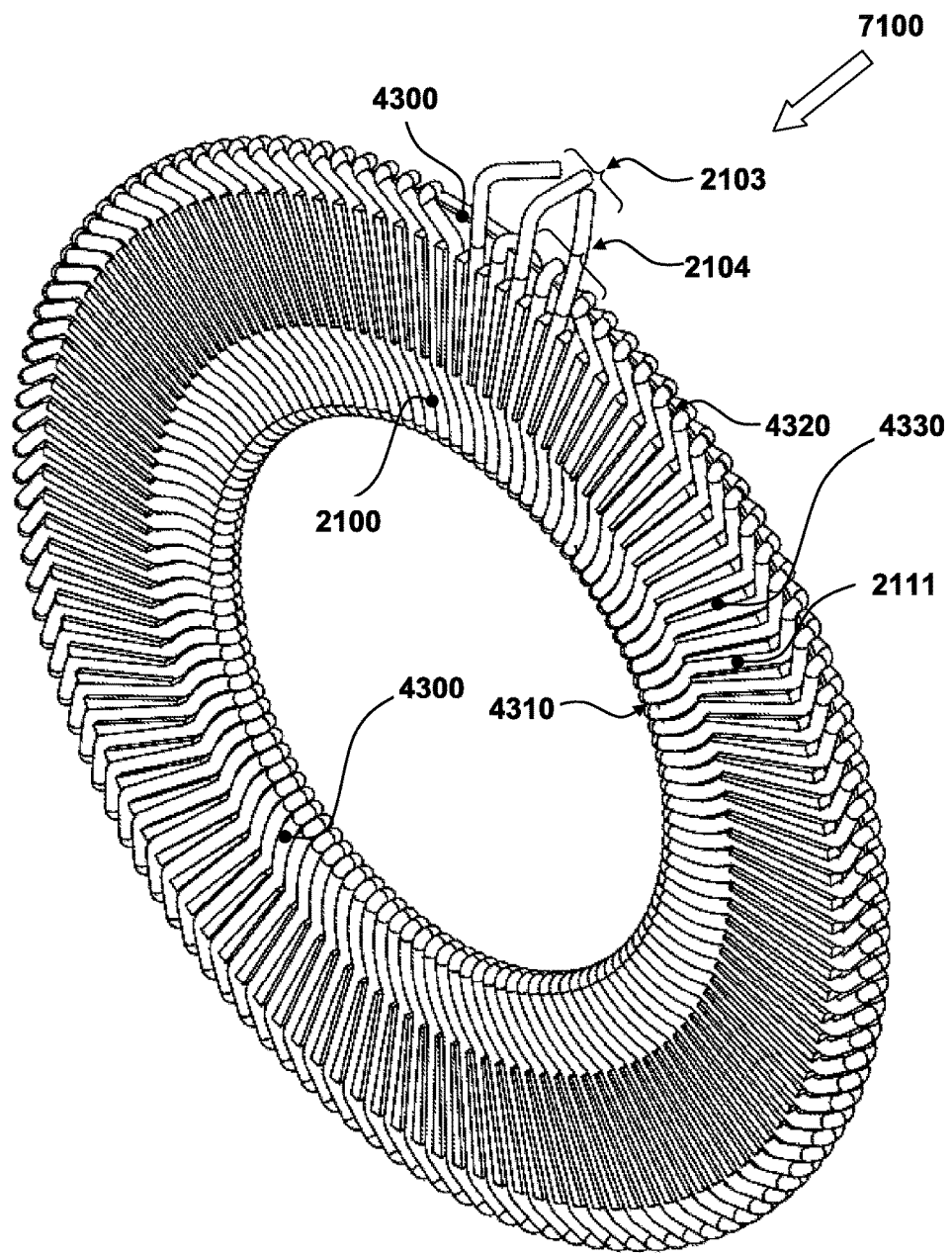
FIG. 22 is an isometric view of a 40-pole 3-phase coreless stator incorporating two stator winding structures similar to those shown in FIGS. 8A and 8B, and further comprising a central disk member as shown in FIG. 20, according to some embodiments of the present invention.

Attention is now drawn to FIG. 22, which is an isometric view of a 40-pole 3-phase coreless stator according to some embodiments of the invention. This exemplary embodiment incorporates two of the stator winding structures disclosed in FIGS. 8A-B, and a central disk member disclosed in FIG. 21A. In this exemplary embodiment a 3-phase stator 7100 comprises three separated mutually spaced conductors 2100, each wrapped 80 times around a central thin disk member 4300, 40 times at its external periphery 4320 and 40 times at its internal periphery 4310. Active sections 2111 of conductors are secured in the slots between ribs 4330.

Figure 23:
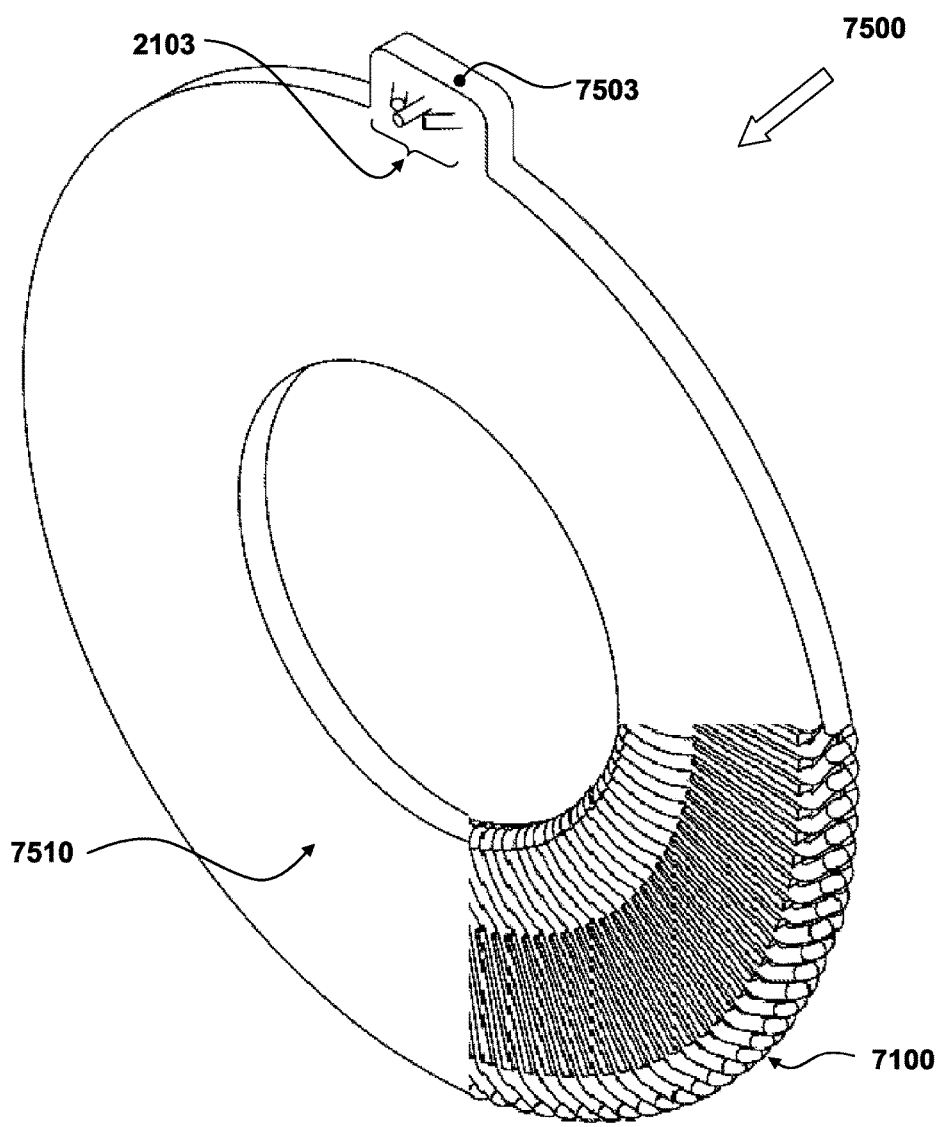
FIG. 23 is an isometric view of a 40-pole 3-phase coreless stator showing the stator of FIG. 22 encapsulated into a solid disk structure, according to some embodiments of the present invention.

Attention is now drawn to FIG. 23, which is an isometric view of a 40-pole 3-phase coreless stator, according to some embodiments of the invention. FIG. 23 shows the stator 7100 of FIG. 22, encapsulated into a solid disk structure 7510. (To illustrate clearly the stator structure, the encapsulating means are shown as removed from a portion of the stator.) Winding terminals 2103 are optionally encapsulated within a rectangular radially offset boss 7503.

Figure 24:
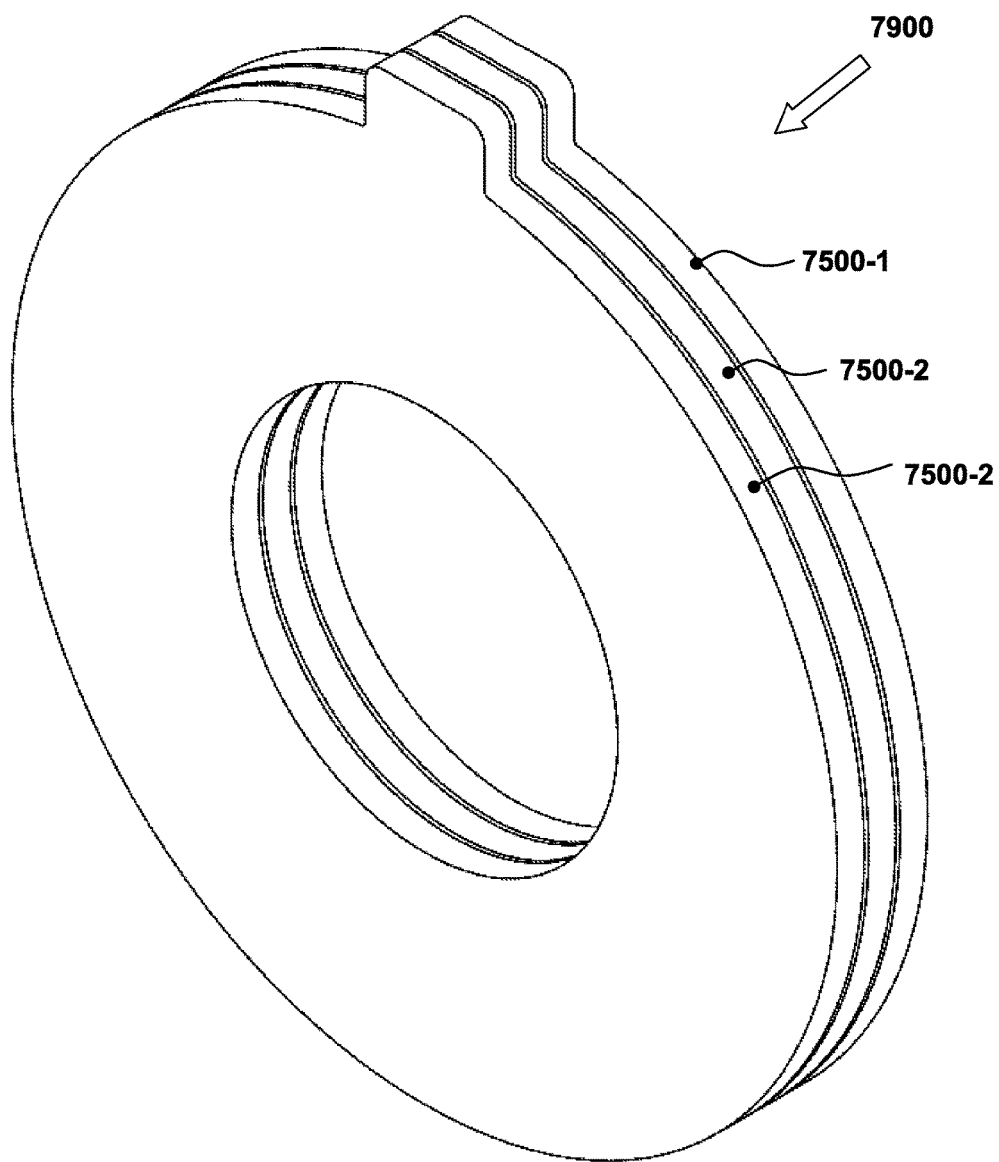
FIG. 24 is an isometric view of a multi-disk coreless stator comprising a plurality of stator disks such as those shown in FIG. 22, the disks being axially attached 'face-to-face' and/or slightly distanced each other, and optionally being electrically connected, according to some embodiments of the present invention.

Attention is now drawn to FIG. 24, which is an isometric view of a multi-disk coreless stator, according to some embodiments of the present invention. The embodiment shown in the figure comprises a plurality of stator disks (such as those disclosed in FIGS. 22 and 23, or others disclosed herein) axially attached face-to-face or slightly distanced from each other, and optionally electrically connected. A multi-disk coreless stator 7900 shown in the figure comprises a plurality of face-to-face stacked stator disks 7500-1, 7500-2, 7500-3.

Figure 25:
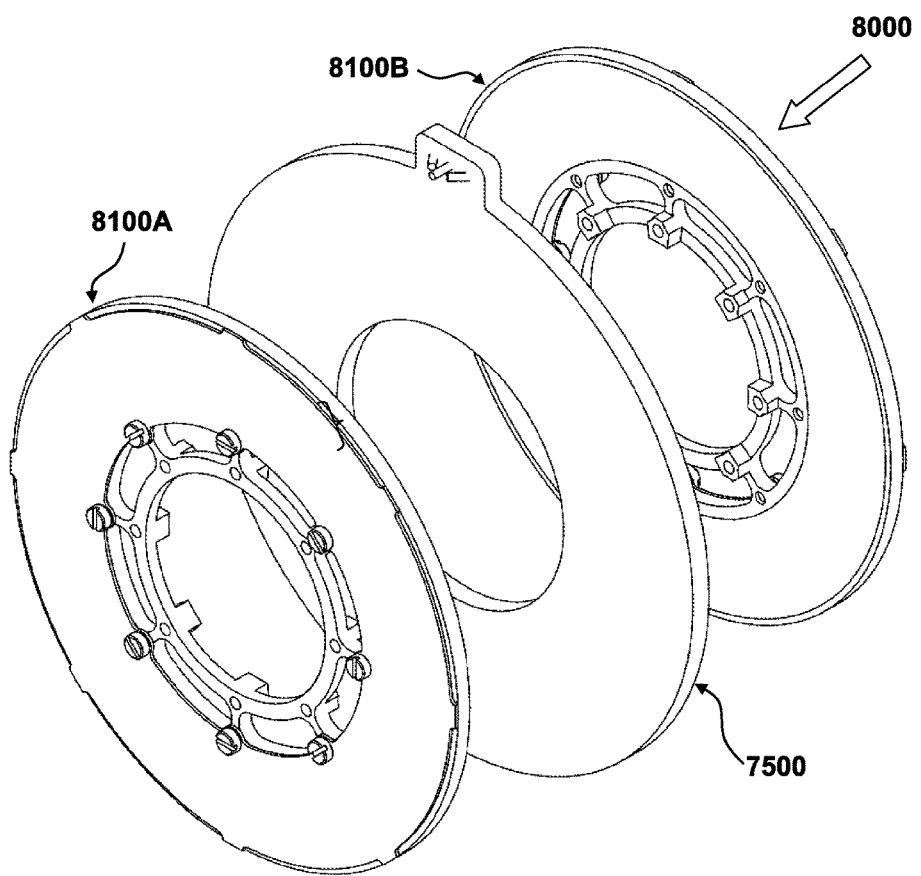
FIG. 25 is an exploded isometric view of an axial flux machine utilizing a coreless stator (e.g. that shown in FIG. 23) interposed between two permanent magnet rotors, according to some embodiments of the present invention.

Attention is now drawn to FIG. 25, which is an exploded isometric view of an axial flux machine 8000 utilizing a coreless stator 7500 according to some embodiments of the invention (e.g. as disclosed in FIG. 23), which is interposed between two permanent magnet rotors 8100A and 8100B.

Figure 26A:
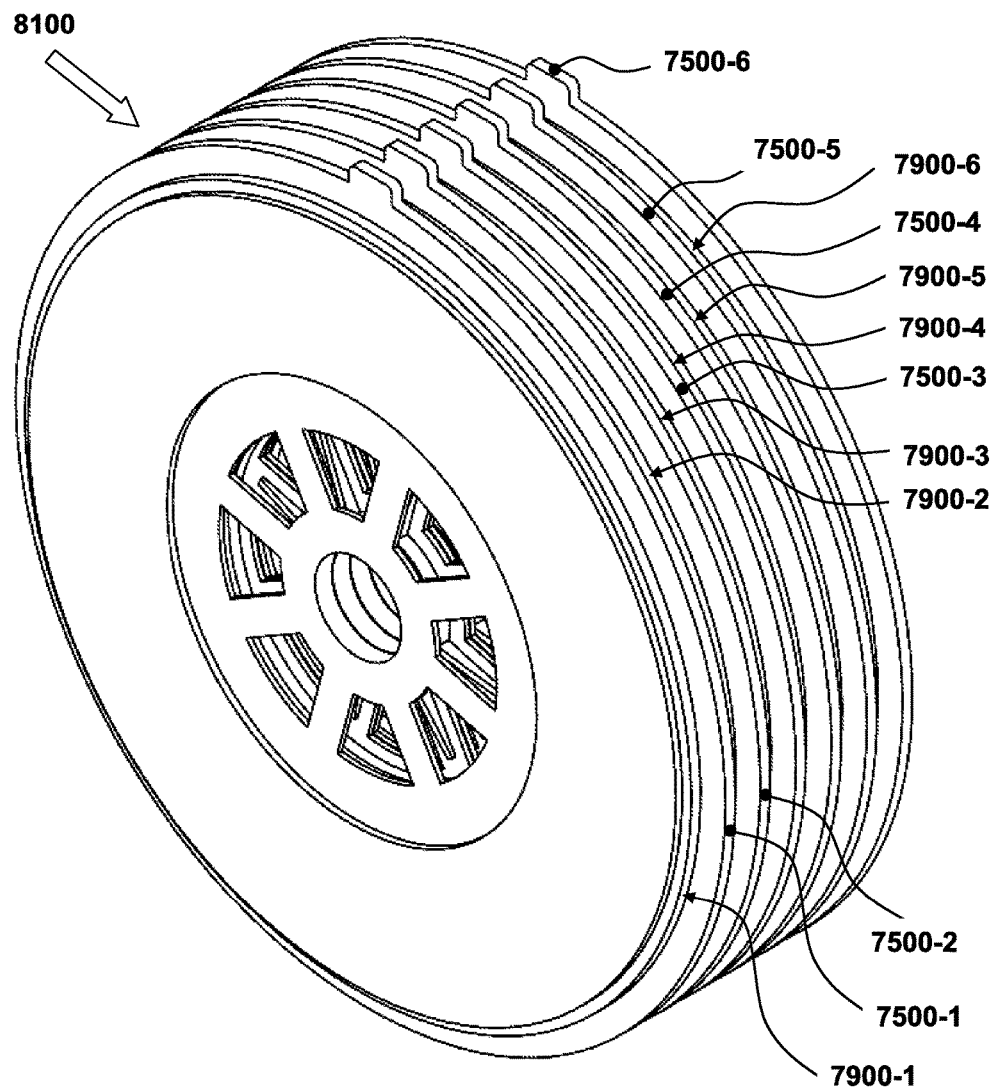
FIGS. 26A and 26B are views of a multi-stage modular axial flux machine utilizing six coreless stators interposed between seven permanent magnet rotors, according to some embodiments of the present invention.
Figure 26B:
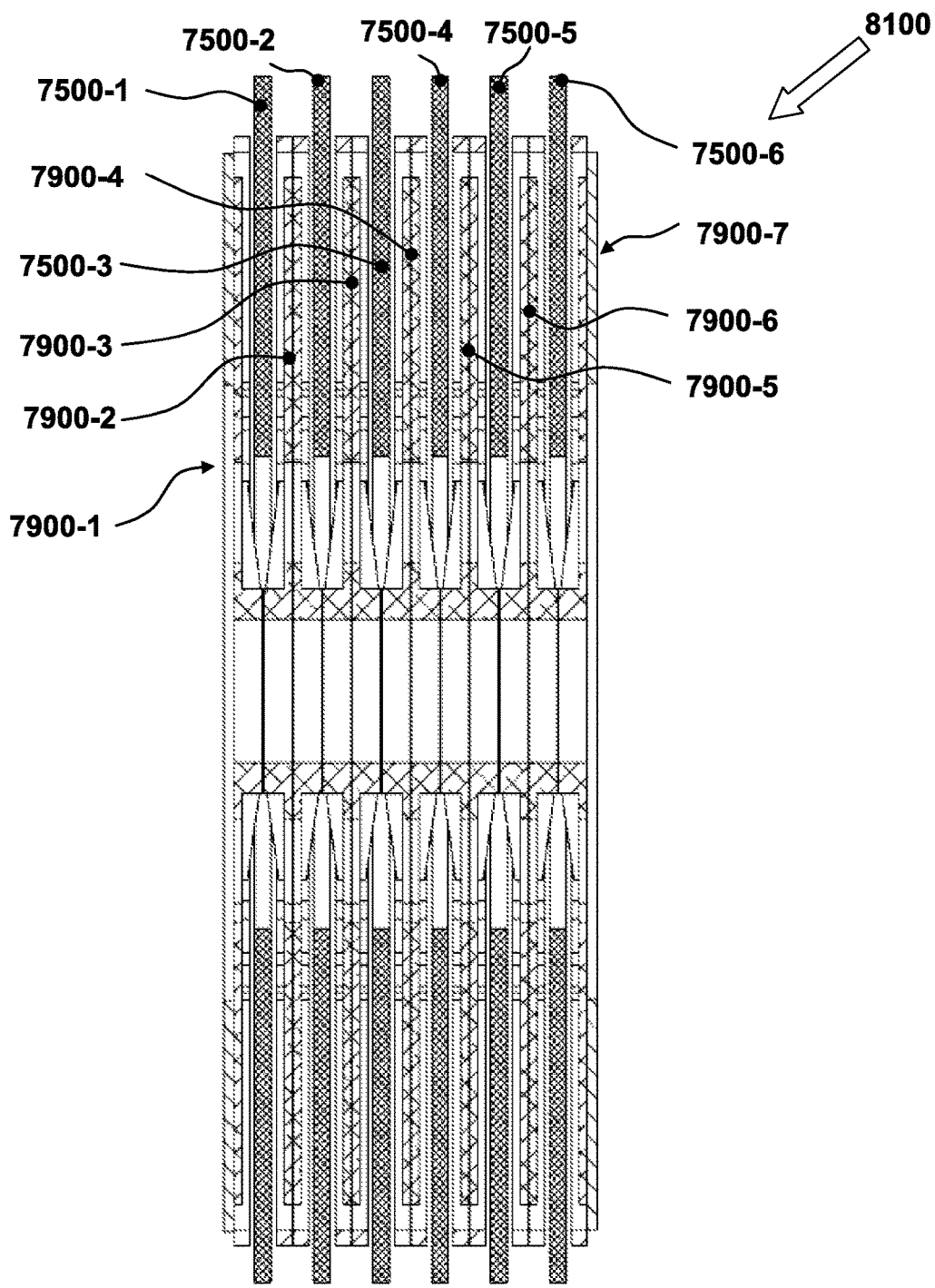

Attention is now drawn to FIGS. 26A and 26B, isometric and cross-sectional views respectively of an exemplary embodiment of a multi-stage modular axial flux machine, according to some embodiments of the present invention. These exemplary embodiments comprise a plurality of coreless stators (e.g. a stator as disclosed in FIG. 24 and/or other stator designs disclosed herein, six stators are shown in the figure) interposed between a plurality of permanent magnet rotors (six are visible in the figure). As can be seen from the figures, the modular design here presented requires the completely planar form of stators 7500, such as those described in detail above and in the accompanying figures.

Figure 27:
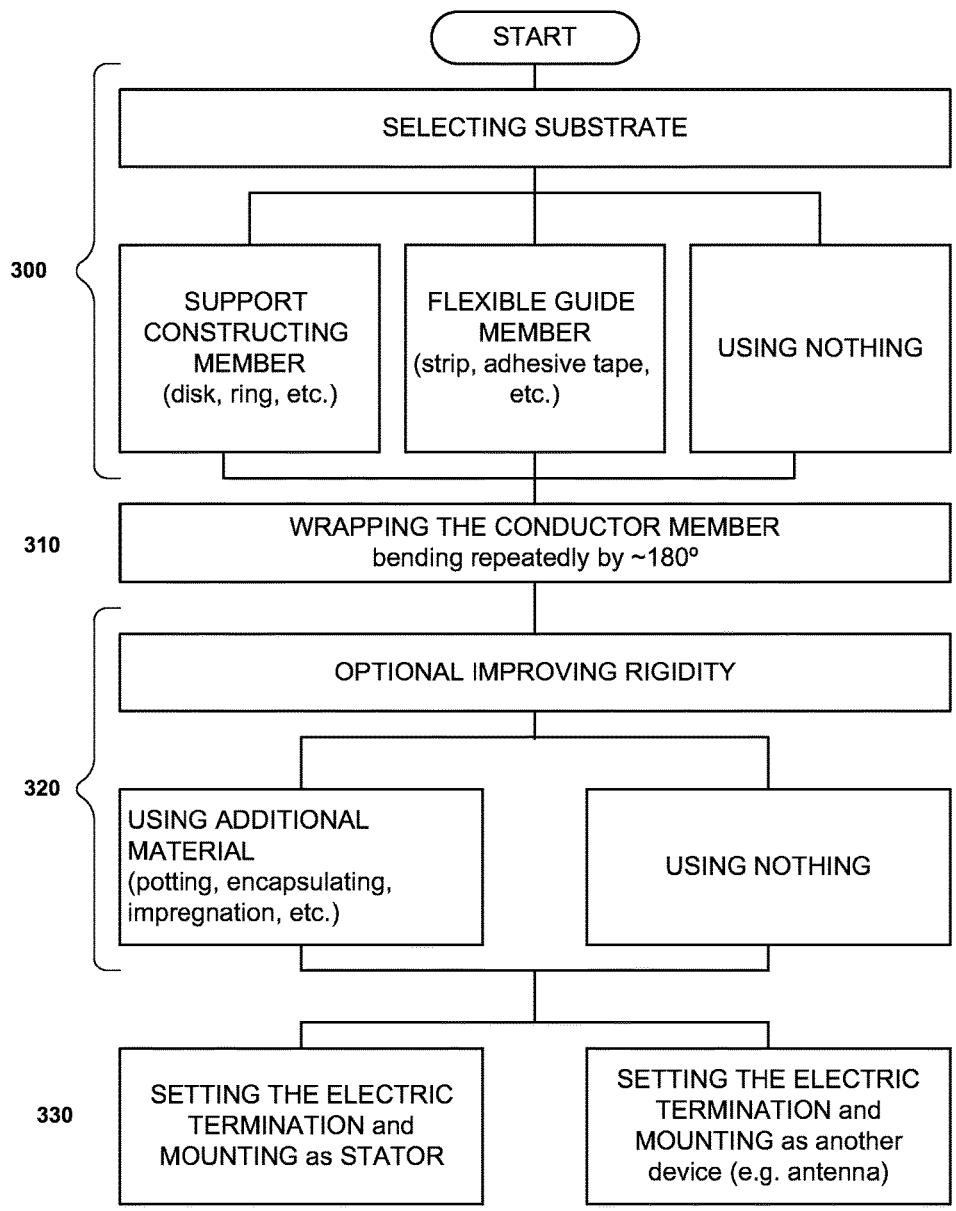
FIG. 27 is a simplified flowchart of a method for producing a space-efficient wound apparatus usable inter alia as a stator in an electric machine.

Attention is now drawn to FIG. 27, which is a simplified flow-chart of a method of bending a conductor, according to some embodiments of the present invention.

At step 300, one may select a substructure to be used. Alternatives may include a support construction member (e.g. hollow disk, a pair of rings, etc.), an optionally flexible guide member (bonding substrate, adhesive tape folded on itself, etc.) and any other support member. Alternatively, no substructure may be used.

At step 310, one or more conductors (optionally having a flat profile) are successively bent about 180° at an external and at an internal periphery, forming a disk-shaped winding with first and second approximately planar surfaces.

At step 320, the obtained construction is optionally improved by using potting and/or encapsulating and/or impregnation technology.

At optional step 330, constructed units may be adapted for mounting and/or mounted as a stator for an electric machine, or alternatively as another device (e.g. an antenna).

It is expected that during the life of a patent maturing from this application many relevant stators will be developed and the scope of the term "stator" is intended to include all such new technologies a priori.

As used herein the terms "about" and "approximately" refer to ±10%.

The terms "comprises", "comprising", "includes", "including", "having" and their conjugates mean "including but not limited to".

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A wound apparatus which comprises a wound conductor in which material of said wound conductor occupies more than 75% of a cylindrical volume which contains said apparatus formed by periodically bending a single preformed flat profile conductor member by about 180° to form a disc with a central aperture having external and internal peripheries and first and second axially displaced planar surfaces between said peripheries, each external periphery of the external peripheries connecting a radially outer portion of the planar surfaces, and each internal periphery of the internal peripheries connecting a radially inner portion of the planar surfaces, wherein said single preformed flat profile conductor member comprises three separate but grouped conductor members connected as a cable which comprises three conductor elements encased in a common isolating element.

2. An axial air-gap electric machine which comprises a planar disk-shaped stator with a central aperture having external and internal peripheries and first and second axially displaced planar surfaces between said peripheries, each external periphery of the external peripheries connecting a radially outer portion of the planar surfaces, and each internal periphery of the internal peripheries connecting a radially inner portion of the planar surfaces, wherein said planar disk-shaped stator comprising a single pre-formed flat profile conductor member that was periodically bent by about 180° to form said external and internal peripheries and said axially displaced first and second planar surfaces between said peripheries.

3. The machine of claim 2, wherein said conductor member is comprised in a flat cable which comprises a plurality of conductor members within an insulating envelope.

4. The machine of claim 2, wherein said conductor member is shaped as a flat conductor wider than it is deep.

5. The machine of claim 2, wherein said conductor member comprises a plurality of independent conductors of differing phases.

6. The machine of claim 2, comprising a plurality of said planar stators.

7. The machine of claim 6, wherein said plurality of stators are axially distanced by less than the width of each stator.

8. The machine of claim 6, further comprising a plurality of planar rotors.

9. The machine of claim 2, wherein said bends at said internal and at said external peripheries are in a same direction.

10. The machine of claim 2, wherein said bends at said internal and at said external peripheries are in opposite directions.

11. The machine of claim 2, wherein said bent conductor member is secured on a substrate tape bent at inner and outer peripheries.

12. The machine of claim 2, wherein said conductor member has a flat form and an adhesive backing on one of its flat sides.

13. The machine of claim 2, wherein said bent conductor member is comprises a chain which comprises a plurality of solid flat links and flexible conductor connections between said links, said links being joined at internal and external peripheries of said stator by said flexible connections.

14. The machine of claim 2, wherein said conductor members are a plurality of electrically independent conductors adjacently wrapped around a central disk.

15. The machine of claim 14, wherein said disk comprises ferromagnetic material.

16. The machine of claim 14, wherein said central disk comprises a plurality of trapezoidal radial ribs not reaching inner and outer peripheries of said disk.

17. The machine of claim 14, wherein said disk comprises plurality of ribs extending to its inner and outer peripheries.

18. The machine of claim 2, wherein said conductor member is repeatedly wrapped around
   a) an internal ring defining an internal periphery of said stator, and b) an external ring defining an external periphery of said stator.

19. The machine of claim 2, wherein said conductor members are encapsulated into a solid disk structure.

20. The machine of claim 2, wherein portions of said single pre-formed flat profile conductor member positioned between said external and internal peripheries are of variable width.

21. The machine of claim 2, wherein said axially displaced planar surfaces are substantially parallel.

* * * * *